US012689297B2

(12) United States Patent
Brambilla et al.

(10) Patent No.: US 12,689,297 B2
(45) Date of Patent: Jul. 21, 2026

(54) CONSTANT ON-TIME BUCK CONVERTER WITH INTERNAL RAMP COMPENSATION FOR IMPROVED LOAD TRANSIENT PERFORMANCE

(71) Applicant: STMicroelectronics International N.V., Geneva (CH)

(72) Inventors: Niccolò Brambilla, San donato Milanese (IT); Andrea Villot, Aosta (IT); Stefano Corona, Borgarello (IT); Cristian Porta, Canegrate (IT); Giovanni Masci, Charvensod (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 147 days.

(21) Appl. No.: 18/893,495

(22) Filed: Sep. 23, 2024

(65) Prior Publication Data

US 2026/0088718 A1    Mar. 26, 2026

(51) Int. Cl.
H02M 3/158          (2006.01)
H02M 3/157          (2006.01)

(52) U.S. Cl.
CPC ........... H02M 3/158 (2013.01); H02M 3/157 (2013.01)

(58) Field of Classification Search
CPC .............................. H02M 3/157; H02M 3/158
See application file for complete search history.

(56) References Cited

U.S. PATENT DOCUMENTS

| | | | | |
|---|---|---|---|---|
| 8,421,432 B2 * | 4/2013 | Hawkes | ................ | H02M 3/156 |
| | | | | 323/283 |
| 9,270,176 B1 | 2/2016 | Nguyen et al. | | |
| 9,647,552 B2 * | 5/2017 | Li | ......................... | H02M 3/158 |
| 10,333,403 B2 * | 6/2019 | Huang | .................. | H02M 3/158 |
| 10,797,597 B1 | 10/2020 | Chang | | |
| 2015/0280556 A1 | 10/2015 | Bari et al. | | |
| 2015/0311798 A1 | 10/2015 | Yuan et al. | | |
| 2018/0152099 A1 * | 5/2018 | Savic | .................... | H02M 3/156 |
| 2019/0229612 A1 | 7/2019 | Chen | | |
| 2021/0067028 A1 | 3/2021 | Li | | |
| 2022/0158537 A1 * | 5/2022 | Xie | ......................... | H02M 1/08 |
| 2023/0198405 A1 | 6/2023 | Bawa et al. | | |

FOREIGN PATENT DOCUMENTS

WO          2023078841 A1    5/2023

* cited by examiner

*Primary Examiner* — Rafael O De Leon Domenech
(74) *Attorney, Agent, or Firm* — Slater Matsil, LLP

(57)          ABSTRACT

A switched-mode power supply includes: a Buck converter; and a control circuit for the Buck converter, which includes: a switching unit configured to generate a switching control signal based on a feedback voltage of the Buck converter and a compensation ramp voltage; a transconductance amplifier, where a first input terminal and a second input terminal of the transconductance amplifier are configured to receive a reference voltage and the feedback voltage, respectively; a switch coupled between an output terminal of the transconductance amplifier and a first node, where the switching unit is coupled between the first node and the Buck converter; a compensation control circuit coupled to a control terminal of the switch and configured to open or close the switch based on a first signal representative of a current flowing through an inductor of the Buck converter; and a ramp signal generator configured to generate the compensation ramp voltage.

20 Claims, 16 Drawing Sheets

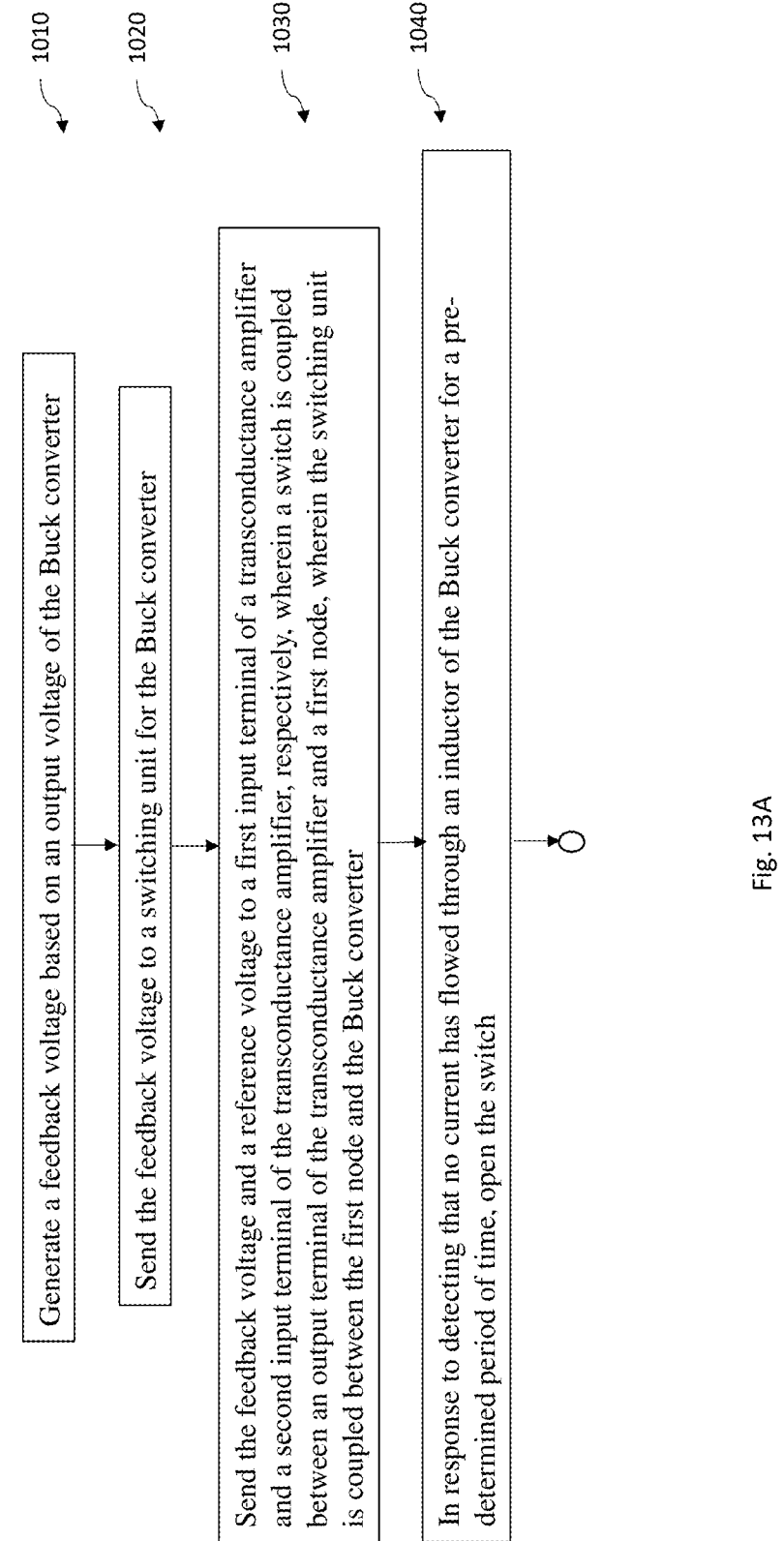

1000

1010
Generate a feedback voltage based on an output voltage of the Buck converter 1020
Send the feedback voltage to a switching unit for the Buck converter 1030
Send the feedback voltage and a reference voltage to a first input terminal of a transconductance amplifier and a second input terminal of the transconductance amplifier, respectively, wherein a switch is coupled between an output terminal of the transconductance amplifier and a first node, wherein the switching unit is coupled between the first node and the Buck converter 1040
In response to detecting that no current has flowed through an inductor of the Buck converter for a pre-determined period of time, open the switch

Generate a compensation ramp voltage using a ramp signal generator — 1050

Send the compensation ramp voltage to the switching unit — 1060

Generate, using the switching unit, a switching control signal for the Buck converter based on the compensation ramp voltage and the feedback voltage of the Buck converter — 1070

CONSTANT ON-TIME BUCK CONVERTER WITH INTERNAL RAMP COMPENSATION FOR IMPROVED LOAD TRANSIENT PERFORMANCE

TECHNICAL FIELD

The present invention relates generally to switched-mode power supply (SMPS), and in particular embodiments, to Constant On-Time (COT) Buck converters with internal ramp compensation.

BACKGROUND

Power converters are pervasive in many electronic applications from computers to automobiles. In some embodiments, voltages within a power converter are generated by performing a DC-DC, DC-AC, and/or AC-DC conversion by operating a switch loaded with an inductor or transformer. Examples of power converters include switched mode power supplies (SMPS) and linear regulators. An SMPS is usually more efficient than other types of power conversion systems because power conversion is performed by controlled charging and discharging of the inductor or transformer, which reduces energy lost due to power dissipation across resistive voltage drops.

An SMPS usually includes at least one switch (also referred to as a power switch) and an inductor or transformer. Some specific topologies include Buck converters, boost converters, and flyback converters, among others. A control circuit is commonly used to open and close the switches to charge and discharge the inductor. In some applications, the current supplied to the load and/or the voltage supplied to the load is controlled via a feedback loop. In some typologies, the switches used in the SMPS are implemented using cascode switches. Linear regulator is another class of power converter where a pass transistor is controlled (e.g., turned on and off) by a controller to provide a steady voltage to an external load.

Buck converter is a popular choice of SMPS and is often used to provide power for a downstream device such as a sensor or a processor. Constant On-Time (COT) control for DC-DC converters allows for fast transient response, but may require careful compensation design. The stability of COT Buck converters is usually addressed with ripple injection strategies using external components, e.g., Equivalent Serial Resistor (ESR), or Time Constant Matching Filter (TCMF). However, using ESR lowers the efficiency of the Buck converter, and the high number of bulky external components used in TCMF is undesirable for customers in terms of cost, complexity, and space required. There is a need in the art for a control circuit that can be integrated with the Buck converter in a same integrated circuit (IC) device, requires little or no external components, and achieves good load transient performance (e.g., small overshoot/undershoot in output voltage when recovering from load transitions).

SUMMARY

In accordance with an embodiment, a switched-mode power supply (SMPS) includes: a Buck converter; and a control circuit for the Buck converter, comprising: a switching unit configured to generate a switching control signal that controls switching of the Buck converter, the switching control signal being generated based on a feedback voltage of the Buck converter and a compensation ramp voltage; a transconductance amplifier, wherein a first input terminal of the transconductance amplifier is configured to receive a reference voltage, and a second input terminal of the transconductance amplifier is configured to receive the feedback voltage; a switch coupled between an output terminal of the transconductance amplifier and a first node, wherein the switching unit is coupled between the first node and the Buck converter; a compensation control circuit coupled to a control terminal of the switch and configured to open or close the switch based on a first signal representative of a current flowing through an inductor of the Buck converter, the compensation control circuit receiving the first signal at its first input terminal; and a ramp signal generator configured to generate the compensation ramp voltage.

In accordance with an embodiment, an integrated circuit (IC) device includes: a Buck converter; and a control circuit for the Buck converter, comprising: a comparator configured to generate a comparator output signal by comparing a first voltage applied at a first input terminal of the comparator with a feedback voltage of the Buck converter applied at a second input terminal of the comparator; a pulse generator configured to generate a pulse signal in response to rising edges in the comparator output signal, wherein the Buck converter is configured to be controlled by the pulse signal; a transconductance amplifier configured to generate, at an output terminal of the transconductance amplifier, a current proportional to a difference between a reference voltage applied at a first input terminal of the transconductance amplifier and a second voltage applied at a second input terminal of the transconductance amplifier; a first capacitor coupled between the output terminal of the transconductance amplifier and an electrical ground node; a ramp circuit configured to generate, at an output terminal of the ramp circuit, a ramp voltage; an adder circuit; a first switch coupled between the output terminal of the ramp circuit and a first input terminal of the adder circuit, wherein a second input terminal of the adder circuit is coupled to the output terminal of the transconductance amplifier, and an output terminal of the adder circuit is coupled to the first input terminal of the comparator; a second switch coupled between the output terminal of the transconductance amplifier and the second input terminal of the transconductance amplifier; and a third switch coupled between the second input terminal of the transconductance amplifier and the second input terminal of the comparator.

In accordance with an embodiment, a method of operating a Buck converter includes: generating a feedback voltage based on an output voltage of the Buck converter; sending the feedback voltage to a switching unit for the Buck converter; sending the feedback voltage and a reference voltage to a first input terminal of a transconductance amplifier and a second input terminal of the transconductance amplifier, respectively, wherein a switch is coupled between an output terminal of the transconductance amplifier and a first node, wherein the switching unit is coupled between the first node and the Buck converter; in response to detecting that no current has flowed through an inductor of the Buck converter for a pre-determined period of time, opening the switch; generating a compensation ramp voltage using a ramp signal generator; sending the compensation ramp voltage to the switching unit; and generating, using the switching unit, a switching control signal for the Buck converter based on the compensation ramp voltage and the feedback voltage of the Buck converter.

BRIEF DESCRIPTION OF THE DRAWINGS

For a more complete understanding of the present invention, and the advantages thereof, reference is now made to the following descriptions taken in conjunction with the accompanying drawings, in which:

FIGS. 13A and 13B together illustrate a flow chart of a method of operating a Buck converter, in some embodiments.

DETAILED DESCRIPTION OF ILLUSTRATIVE EXAMPLES

Figure 1:
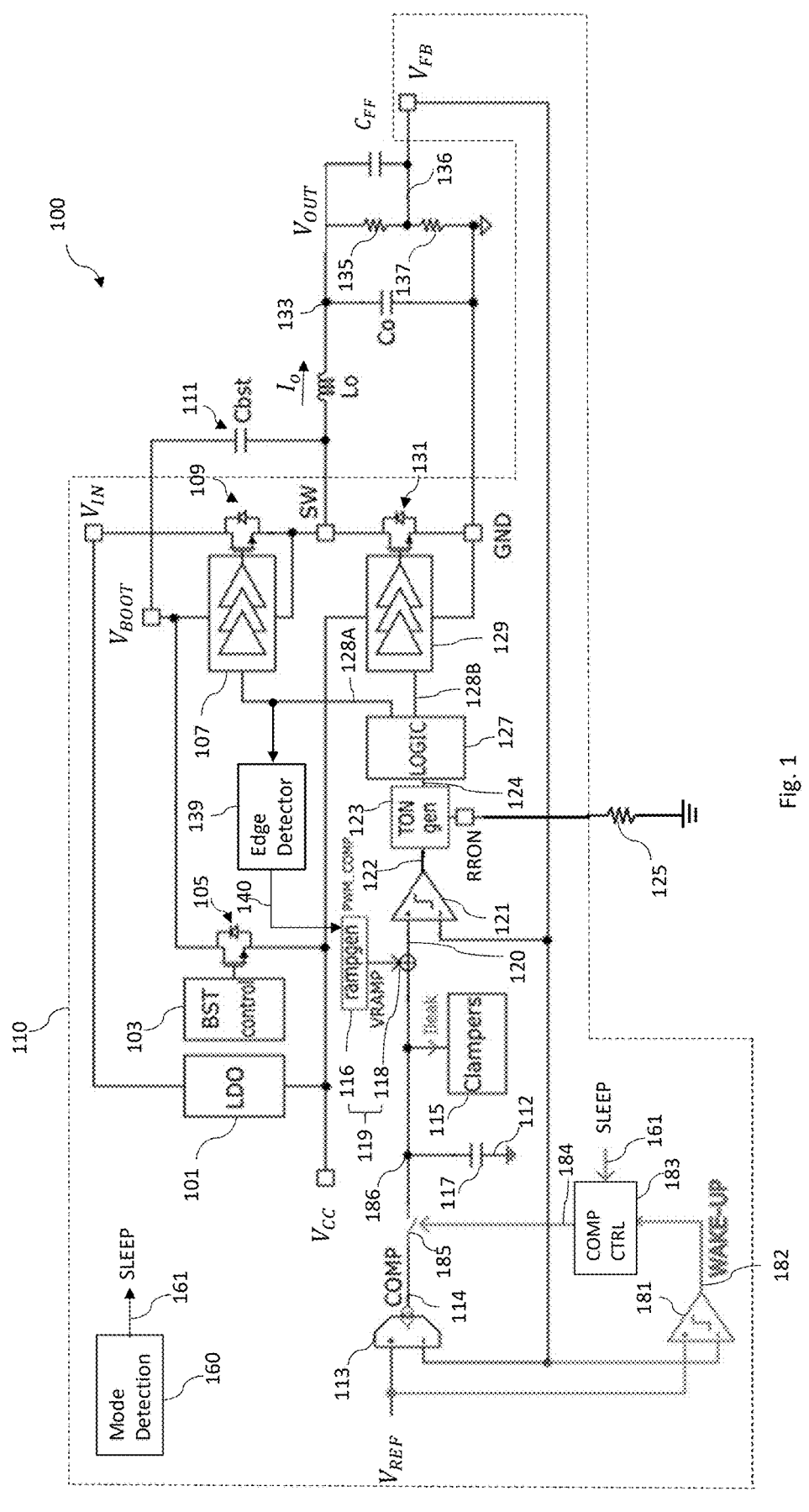
FIG. 1 illustrates a block diagram of a switched-mode power supply (SMPS), in an embodiment.

The making and using of the presently disclosed examples are discussed in detail below. It should be appreciated, however, that the present invention provides many applicable inventive concepts that can be embodied in a wide variety of specific contexts. The specific examples discussed are merely illustrative of specific ways to make and use the invention, and do not limit the scope of the invention. Throughout the discussion herein, unless otherwise specified, the same or similar reference numerals or labels in different figures refer to the same or similar component or signal.

The present disclosure will be described with respect to examples in a specific context, namely a COT Buck converter with a control circuit for stability control and improved load transient performance. Most components of the COT Buck converter and the control circuit are integrated into a same integrated circuit (IC) device, with a few number of components implemented as external components of the IC device, in some embodiments.

FIG. 1 illustrates a block diagram of a switched-mode power supply (SMPS) 100, in an embodiment. Note that for simplicity, not all features of the SMPS 100 are illustrated. The SMPS 100 in FIG. 1 is a Buck converter with a control circuit that achieves stability control for the Buck converter in a steady state of the Buck converter, and achieves improved load transient performance (e.g., reduced output voltage overshoot/undershoot when there are load transitions).

In the example of FIG. 1, components within the dashed box are integrated together on a same semiconductor substrate (e.g., silicon) to form an integrated circuit (IC) device 110 or a portion of an IC device 110. An example of the IC device 110 may be a power-management integrated circuit (PMIC) device. The components outside the dashed box are referred to as external components connected to the IC device 110. The pins of the IC device 110 are illustrated in FIG. 1 as rectangular shaped connectors. As illustrated in FIG. 1, the number of external components needed for the IC device 110 is very small, which advantageously lowers the pin count for the IC device 110.

In FIG. 1, the Buck converter includes a switch 109 (also referred to as a high-side switch), a switch 131 (also referred to as a low-side switch), a gate driver circuit 107 for the switch 109, a gate driver circuit 129 for the switch 131, and a logic circuit 127 for generating the switching control signal 128 (e.g., 128A and 128B) from a pulse signal 124 generated by a pulse generator 123. The Buck converter further includes an inductor $L_O$ and a capacitor $C_O$. In the example of FIG. 1, the switches 109 and 131 are N-type transistors. In another embodiment, the switch 109 is a P-type transistor, and the switch 131 is an N-type transistor. These and other variations are fully intended to be included within the scope of the present disclosure.

The switch 109 is coupled between a pin $V_{IN}$ of the IC device 110 and a pin SW of the IC device 110, and the switch 131 is coupled between the pin SW and a pin GND. The pin $V_{IN}$ is configured to receive a supply voltage (e.g., a voltage between +6V and +100 V), and the pin GND is configured to be connected to a reference voltage (e.g., electrical ground). The inductor $L_O$ is coupled between the pin SW and a node 133, and the capacitor $C_O$ is coupled between the node 133 and the pin GND. During operation of the Buck converter, the voltage at the node 133 is the output voltage $V_{OUT}$ of the Buck converter.

The gate driver circuits 107 and 129 are configured to receive a switching control signal 128A and a switching control signal 128B, respectively, for the Buck converter, and are configured to generates control signals (e.g., gate control signals) for the switches 109 and 131, e.g., by amplifying and/or voltage-shifting the switching control signals 128A and 128B, or by allowing or dis-allowing a voltage source to be applied as the gate-source voltage of a respective transistor 109 or 131. The switches 109 and 131 are transistors in the illustrated embodiments. In an example where the Buck converter works in continuous conduction mode (CCM), and the switches 109 and 131 are the same type (e.g., N-type) of transistors, the logic circuit 127 generates the switching control signals 128A and 128B with opposite values (e.g., logic HIGH or logic LOW), thereby setting the switches 109 and 131 in opposite states (e.g., ON state or OFF state) during operation of the Buck converter. In other words, for the above example of continuous conduction mode, during operation of the Buck converter, the switch 109 is closed when the switch 131 is open, and switch 109 is open when the switch 131 is closed. In the continuous conduction mode, the current $I_O$ flowing through the inductor $L_O$ varies over time, but the current does not drop to zero. When the Buck converter works in discontinuous conduction mode (DCM), there are periods of time when both the switches 109 and 131 are open, and there is no current flowing through the inductor $L_O$.

The Buck converter of FIG. 1 further includes a boot-strap capacitor 111, a boot-strap control circuit 103, a switch 105 (e.g., a transistor 105), and a low-dropout (LDO) regulator 101. The boot-strap capacitor 111 is coupled between a pin $V_{BOOT}$ and the pin SW. The load path terminals (e.g., drain terminal and source terminal) of the transistor 105 are coupled between the pin $V_{BOOT}$ and a pin $V_{CC}$. The pin $V_{CC}$ is configured to be coupled to another supply voltage (e.g., a +5V voltage), which is derived from the supply voltage at the pin $V_{IN}$ by the LDO regulator 101 in the example of FIG. 1. Besides the LDO regulator, other types of linear regulators may also be used to generate the supply voltage at the pin $V_{CC}$. In some embodiments, the supply voltage at the pin $V_{CC}$ may be provided by an external voltage source outside the IC device 110 without using a regulator inside the IC device 110. During operation of the Buck converter, when the switch 109 (e.g., an N-type transistor) needs to be closed (e.g., needs to turn the transistor 109 ON), the boot-strap control circuit 103 turns off the switch 105, and the voltage across the boot-strap capacitor 111 (provided by the charge stored in the boot-strap capacitor 111) provides a gate-source voltage of, e.g., +5V, for the transistor 109 to turn ON the transistor 109. When the voltage at the pin SW is low (e.g., the corresponding voltage at the pin $V_{BOOT}$ is equal to or lower than the voltage at the pin $V_{CC}$) after the switch 109 is open (e.g., the transistor 109 turned OFF), the boot-strap control circuit 103 turns on the transistor 105, such that the supply voltage at the pin $V_{CC}$ charges the boot-strap capacitor 111 (e.g., to restore the +5V voltage across the boot-strap capacitor 111). The capacitance of the boot-strap capacitor 111 may be large, thus an external capacitor is used as the boot-strap capacitor 111, and the pin $V_{BOOT}$ is used to provide an electrical connection between the boot-strap capacitor 111 and the switch 105.

The Buck converter illustrated in FIG. 1 is merely a non-limiting example. Variations are possible and are fully intended to be included within the scope of the present disclosure. For example, the switch 131 in FIG. 1 may be replaced by a diode with its cathode connected to the pin SW and its anode connected to the pin GND.

The control circuit for the Buck converter and the operation of the control circuit are discussed hereinafter. In the illustrated embodiment of FIG. 1, components of the IC device 110 not belonging to the Buck converter belong to the control circuit.

Still referring to FIG. 1, the output voltage $V_{OUT}$ of the Buck converter is sent to a voltage divider formed by resistors 135 and 137, which are coupled between the node 133 and a reference node connected to a reference voltage (e.g., electrical ground). The output of the voltage divider, referred to as a feedback voltage 136 (may also be referred to as a feedback voltage $V_{FB}$), is sent to the pin $V_{FB}$ of the IC device 110. In the example of FIG. 1, a feedforward capacitor $C_{FF}$ is coupled between the node 133 and the pin $V_{FB}$. The feedforward capacitor $C_{FF}$ may be used to stabilize the system over a wide number of applicative points in terms of output voltage and frequency. In some embodiments, the feedforward capacitor $C_{FF}$ is omitted.

As illustrated in FIG. 1, the feedback voltage 136 is sent to an inverting input terminal of the PWM comparator 121 (also referred to as a comparator 121), and sent to an inverting input terminal of a transconductance amplifier 113. A reference voltage $V_{REF}$ is supplied to a non-inverting input terminal of the transconductance amplifier 113. The reference voltage $V_{REF}$ may be derived from an internal voltage of the IC device 110, and used for setting the target output voltage or the target feedback voltage of the Buck converter, in some embodiments. In some embodiments, the transconductance amplifier 113 generates, at an output terminal 114 of the transconductance amplifier 113, an output current that is proportional to a difference between the reference voltage $V_{REF}$ and the feedback voltage 136.

In the example of FIG. 1, a switch 185 (e.g., a transistor) is coupled between the output terminal 114 of the transconductance amplifier 113 and a node 186, and a capacitor 117 is coupled between the node 186 and a reference voltage node 112 (e.g., a node for connecting to electrical ground). A control terminal (e.g., a gate terminal of a transistor) of the switch 185 is coupled to an output terminal of a compensation control circuit 183. The compensation control circuit 183 generates, at its output terminal, a control signal 184 that is used to open or close the switch 185. The control signal 184 is generated by the compensation control circuit 183 based on a status indicator 161 generated by a mode detection circuit 160, and based on an output signal 182 of a comparator 181, as discussed below.

In some embodiments, the status indicator 161 (also referred to as a control signal SLEEP) is a one-bit signal and is used to indicate whether the Buck converter has entered a deep discontinuous conduction mode (Deep DCM, also referred to as a sleep mode). In some embodiments, the mode detection circuit 160 monitors (e.g., measures, estimates) the current $I_O$ of the inductor $L_O$ (e.g., the current flowing through the inductor $L_O$). As an example, the mode detection circuit 160 may use a current sensor to monitor the current $I_O$. As another example, the mode detection circuit 160 may indirectly measure the current $I_O$ of the inductor $L_O$ by measuring a voltage across a small resistor coupled in series with the inductor $L_O$. As yet another example, the current $I_O$ may be monitored by monitoring the current in the switch 131.

In some embodiments, when the load of the Buck converter is moderate or heavy, the Buck converter works in continuous conduction mode in order to provide a target output voltage for the load. In the continuous conduction mode, there is always current flowing through the inductor $L_O$ (e.g., the current $I_O$ does not drop to zero), and the mode detection circuit 160 sets the status indicator 161 to a zero value (e.g., a bit "0"). When the load is light, or when the load is released (e.g., removed), the Buck converter may enter discontinuous conduction mode, and the current $I_O$ may drop to zero (e.g., no current flowing through the inductor $L_O$). In some embodiments, the mode detection circuit 160 detects the moment (e.g., the time instant) the current $I_O$ drops to zero, and starts a timer at that moment. The timer counts a pre-determined period of time $\Delta T$, which may be, e.g., between a few microseconds to tens of microseconds. When the timer expires, if the current $I_O$ is still zero, then the mode detection circuit 160 sets the status indicator 161 to one (e.g., a bit "1"), which indicates that the Buck converter has entered the deep discontinuous conduction mode (or sleep mode). Certain portions of the SMPS 100 may be shut down in the sleep mode to save energy. In some embodiments, after the Buck converter enters the sleep mode, when there is an increase in the load of the Buck converter, the output voltage of the Buck converter (and the corresponding feedback voltage $V_{FB}$) decreases. When the feedback voltage $V_{FB}$ drops below a compensation ramp voltage 120 generated by a ramp signal generator 119, the Buck converter ends the sleep mode and enters, e.g., continuous conduction mode, and starts switching the switches 109 and 131 in order to provide a target output voltage. As a result, the current $I_O$ increases above zero (e.g., there is current flowing through the inductor $L_O$). Accordingly, the mode detection circuit 160 sets the status indicator 161 to zero, which indicates that the sleep mode has ended. In FIG. 1, the status indicator 161 is sent to a first input terminal of the compensation control circuit 183.

Still referring to FIG. 1, the reference voltage $V_{REF}$ and the feedback voltage $V_{FB}$ are sent to a non-inverting input terminal and an inverting input terminal of the comparator 181, respectively. The output signal 182 (also referred to as a WAKE-UP signal) of the comparator 181 is sent to a second input terminal of the compensation control circuit 183.

The compensation control circuit 183 generates the control signal 184 based on the status indicator 161 and the output signal 182. In some embodiments, when the status indicator 161 has a value of one, the control signal 184 is set to a value of zero in order to open the switch 185; when the output signal 182 has a value of one, the control signal 184 is set to a value of one in order to close the switch 185. In other words, when the Buck converter is in sleep mode, the switch 185 is opened; when the feedback voltage $V_{FB}$ drops below the reference voltage $V_{REF}$, the switch 185 is closed. In some embodiments, the compensation control circuit 183 is implemented as a D flip-flop, with the RESET terminal of the D flip-flop connected to the status indicator 161, and the SET terminal of the D flip-flop connected to the output signal 182. Other implementations of the compensation control circuit 183 are possible, and are fully intended to be included within the scope of the present disclosure.

When the switch 185 is closed, the output current of the transconductance amplifier 113 charges the capacitor 117 and generates a voltage COMP at the output terminal 114 and at the node 186. The voltage COMP is sent to the ramp signal generator 119, which includes a ramp circuit 116 and an adder circuit 118. An example of the ramp signal generator 119 is discussed hereinafter with reference to FIGS. 6A and 6B. In addition, a control signal 140, which is generated by an edge detector 139, is also sent to the ramp signal generator 119. In an embodiment, the edge detector 139 is a rising edge detector, which generates a narrow pulse (e.g., having a pulse width between a few nanoseconds and tens of nanoseconds) when a rising edge in the switching control signal 128A is detected. In other words, the edge detector 139 generates a narrow pulse in the control signal 140 in response to a rising edge in the switching control signal 128A, such that the narrow pulse occurs at the rising edge of the switching control signal 128A. The narrow pulses in the control signal 140 may be used as a reset signal for the ramp signal generator 119 and other circuits of the IC device 110.

When the switch 185 is closed, the ramp circuit 116 of the ramp signal generator 119 generates a ramp voltage, and the adder circuit 118 of the ramp signal generator 119 adds the ramp voltage and the voltage COMP to generate the compensation ramp voltage 120 at its output terminal. The compensation ramp voltage 120 is sent to a non-inverting input terminal of the comparator 121 in the example of FIG. 1. Details of the ramp voltage and an example of the ramp signal generator 119 are discussed hereinafter.

When the switch 185 is open, the capacitor 117 is disconnected from the output terminal 114 of the transconductance amplifier 113, and the output terminal 114 is left in a high-impedance state. Therefore, the voltage at the node 186 is held at a fixed value by the capacitor 117, where the fixed value is the voltage at the node 186 right before the switch 185 is opened. In addition, when the switch 185 is open, the output of the ramp circuit 116 is frozen, e.g., by holding the output (e.g., a ramp voltage) of the ramp circuit 116 at a fixed value, where the fixed value is the value of the ramp voltage right before the switch 185 is opened. As a result, the output of the ramp signal generator 119, which is the compensation ramp voltage 120, is held at a fixed value when the switch 185 is open.

FIG. 1 further illustrates a clamping circuit 115 coupled to the node 186. In some embodiments, the clamping circuit 115 is configured to set a lower limit for the voltage at the node 186. In other words, the clamping circuit 115 limits the minimum value of the voltage at the node 186 to a predetermined voltage value (e.g., a lower boundary for the voltage value). Clamping circuit is known and used in the art, thus details are not discussed here. In some embodiments, the leakage current of the clamping circuit 115 is very small, e.g., smaller than 100 pA, which helps to maintain (or reduce the drop in) the voltage at the node 186 when the switch 185 is open.

The comparator 121 compares the compensation ramp voltage 120 with the feedback voltage 136, and generates an output signal 122 (also referred to as a PWM_COMP signal). For example, if the compensation ramp voltage 120 is higher than the feedback voltage 136, the output signal 122 has a logic HIGH value; and if the compensation ramp voltage 120 is lower than the feedback voltage 136, the output signal 122 has a logic LOW value.

In the example of FIG. 1, the pulse generator 123 is configured to detect a rising edge in the output signal 122 and generate a pulse in the pulse signal 124 in response to the detection of the rising edge. The pulses in the pulse signal 124 have a fixed pulse width, and are used by the logic circuit 127 to generate the switching control signals 128A and 128B. For example, when the Buck converter works in the continuous conduction mode, the pulse signal 124 may be passed through the logic circuit 127 and used as the switching control signal 128A, and a complement of the pulse signal 124 (e.g., generated by an inverter in the logic circuit 127) is used as the switching control signal 128B. When the Buck converter works in discontinuous conduction mode, additional circuits of the logic circuit 127 generate the dead time where both switches 109 and 131 are open. In some embodiments, the pulse width (e.g., duration when the pulse signal 124 has a logic HIGH value) of the pulse signal 124 determines (e.g., equals to) the ON time of the switch 109 (or 131), and since the pulse width of the pulse signal 124 is constant, the Buck converter discussed herein functions as a Constant On-Time (COT) Buck converter. Note that in FIG. 1, a resistor 125 is coupled to the pin RRON of the IC device 110, and is used to determine the pulse width of the pulse signal 124. Therefore, the pulse generator 123 illustrated in FIG. 1 inside the dashed box corresponds to portions of the pulse generator integrated in the IC device 110, the resistor 125 is part of the pulse generator, but is implemented as an external component. The comparator 121, the pulse generator 123, the logic circuit 127, and the capacitor 117 may be collectively referred to as a switching unit of the control circuit for the Buck converter.

In some embodiments, when the Buck converter is in a steady state, the switch 185 is closed, and the control circuit of the Buck converter performs stability compensation through two feedback paths: a fast path that provides the feedback voltage $V_{FB}$ directly to an inverting input terminal of the pulse-width modulation (PWM) comparator 121, and a slow path that achieves better accuracy by providing a new set point (e.g., a voltage COMP) for the PWM comparator 121. Since the control circuit of the Buck converter has two feedback paths for voltage control, the control circuit is also referred to as a control circuit with a V2COT architecture, and the SMPS 100 (or 100A, 100B, 100C) is also referred to as a Buck converter with a V2COT control circuit. The control circuit of the Buck converter is referred to as working in V2COT mode when the switch 185 is closed.

In some embodiments, when there is a load transition, such as when there is a large reduction in load or a load release (e.g., removal of load), the Buck converter enters the sleep mode. In response to the detection of the sleep mode, the control circuit of the Buck converter opens the switch 185 and freezes the ramp signal generator 119 (e.g., the compensation ramp voltage 120 is held at a fixed value achieved at the moment the switch 185 is opened). After the switch 185 is opened, the control circuit monitors the feedback voltage $V_{FB}$, and when the feedback voltage $V_{FB}$ drops below the reference voltage $V_{REF}$, e.g., due to a sudden increase of load, the switch 185 is closed. After the switch 185 is closed, the feedback voltage $V_{FB}$ drops below the compensation ramp voltage 120 after a period of time, and the Buck converter ends (e.g., gets out of) the sleep mode and starts switching the switches 109 and 131 to provide a target output voltage for the load. By opening the switch 185 and freezing the ramp signal generator 119 during the sleep mode, decrease of the compensation ramp voltage 120 during the sleep mode is reduced or avoided. As a result, the time delay between the end of the sleep mode and the closing of the switch 185 is reduced, which in turn advantageously reduces the undershoot/overshoot in the Buck converter output voltage during this time delay. Therefore, as discussed above, the disclosed architecture and operation method achieve accurate stability control during steady state, and reduces Buck converter output voltage undershoot/overshoot where there is load transition (e.g., when recovering from sleep mode). More details are discussed hereinafter with reference to FIGS. 7A and 7B.

Figure 2:
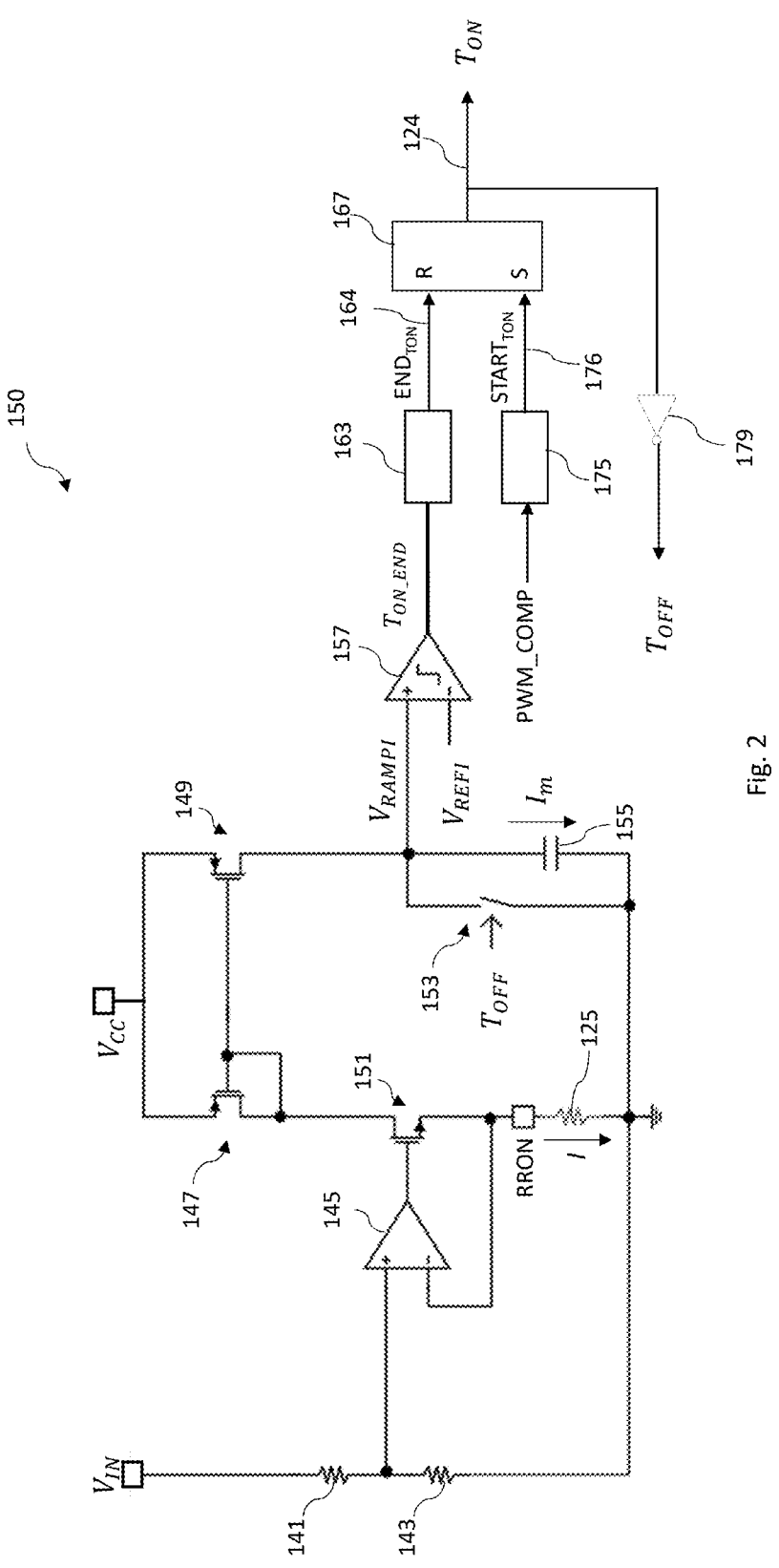
FIG. 2 illustrates a block diagram of a pulse generator, in an embodiment.

FIG. 2 illustrates a block diagram of a pulse generator 150, in an embodiment. The pulse generator 150 may be used as the pulse generator 123 of FIG. 1. Note that the resistor 125 coupled to the pin RRON of the IC device 110 in FIG. 1 is also plotted in FIG. 2.

In FIG. 2, the pulse generator 150 includes an operational amplifier 145. A first input terminal (e.g., a non-inverting input terminal) of the operational amplifier 145 is coupled to an output terminal of a voltage divider formed by resistors 141 and 143. The resistors 141 and 143 are coupled between the pin $V_{IN}$ and a reference voltage node (e.g., electrical ground). The voltage divider provides a scaled version of the voltage at the pin $V_{IN}$, denoted as $K_s \times V_{IN}$, to the first input terminal of the operational amplifier 145, where $K_s$ is a constant scaling factor.

A second input terminal (e.g., an inverting input terminal) of the operational amplifier 145 is coupled to the pin RRON. The voltage at the second input terminal of the operational amplifier 145, which is equal to the voltage at the first input terminal of the operational amplifier 145, generates a current $I=K_s \times V_{IN}/R_{RON}$ that flows through the resistor 125, where $R_{RON}$ is the resistance of the resistor 125. A mirror current $I_m$ is generated by the current mirror circuit (which includes transistors 147 and 149), and charges a capacitor 155 coupled to a non-inverting input terminal of a comparator 157.

A switch 153 is coupled in parallel to the capacitor 155, and is controlled by a control signal $T_{OFF}$. When the control signal $T_{OFF}$ is logic HIGH, the switch 153 is closed to discharge the capacitor 155. When the control signal $T_{OFF}$ is logic LOW, the switch 153 is open, and the mirror current $I_m$ charges the capacitor 155. As a result, the voltage across the capacitor 155, denoted as voltage $V_{RAMPI}$, increases linearly from zero. The comparator 157 compares the voltage $V_{RAMPI}$ with a reference voltage $V_{REFI}$ applied at an inverting input terminal of the comparator 157, and generates an output signal $T_{ON\_END}$. The reference voltage $V_{REFI}$ may be a constant reference voltage generated internally from other supply voltage within the IC device 110.

Still referring to FIG. 2, the output signal $T_{ON\_END}$ of the comparator 157 is sent to an edge detector 163. The edge detector 163 is configured to detect a rising edge in the output signal $T_{ON\_END}$ and generate an output signal 164 (e.g., a short pulse for each rising edge, also referred to as a $END_{TON}$ pulse) that starts at the rising edge of the output signal $T_{ON\_END}$. FIG. 2 also illustrates another edge detector 175. The edge detector 175 is configured to receive the PWM_COMP signal from the comparator 121 of FIG. 1, detect a rising edge in the PWM_COMP signal, and generate an output signal 176 (e.g., a short pulse for each rising edge, also referred to as a $START_{TON}$ pulse) that starts at the rising edge of the PWM_COMP signal. Each $START_{TON}$ pulse and a respective $END_{TON}$ pulse are used to generate a pulse signal, details are discussed below with reference to FIGS. 2 and 3.

In the example of FIG. 2, the output signal 176 (e.g., the $START_{TON}$ pulse) of the edge detector 175 is sent to a SET(S) terminal of a flip-flop 167, and the output signal 164 (e.g., the $END_{TON}$ pulse) of the edge detector 163 is sent to a RESET (R) terminal of the flip-flop 167. The flip-flop 167 may be, e.g., a Set-Reset (SR) latch that is formed by a pair of cross-coupled NOR gates. In some embodiments, the pulse signal 124 of the flip-flop 167 maintains its current value when the SET terminal and the RESET terminal are in the logic LOW state (e.g., signals at the SET and RESET terminals have the logic LOW value). If the SET terminal is pulsed high while the RESET terminal is held low, then the pulse signal 124 is forced high, and stays high when the SET terminal returns to low; similarly, if the RESET is pulsed high while the SET terminal is held low, then the pulse signal 124 is forced low, and stays low when the RESET terminal returns to low. The pulse signal 124 may also be referred to as a $T_{ON}$ signal, and the $T_{OFF}$ Signal is generated by inverting the $T_{ON}$ signal using an inverter 179.

Figure 3:
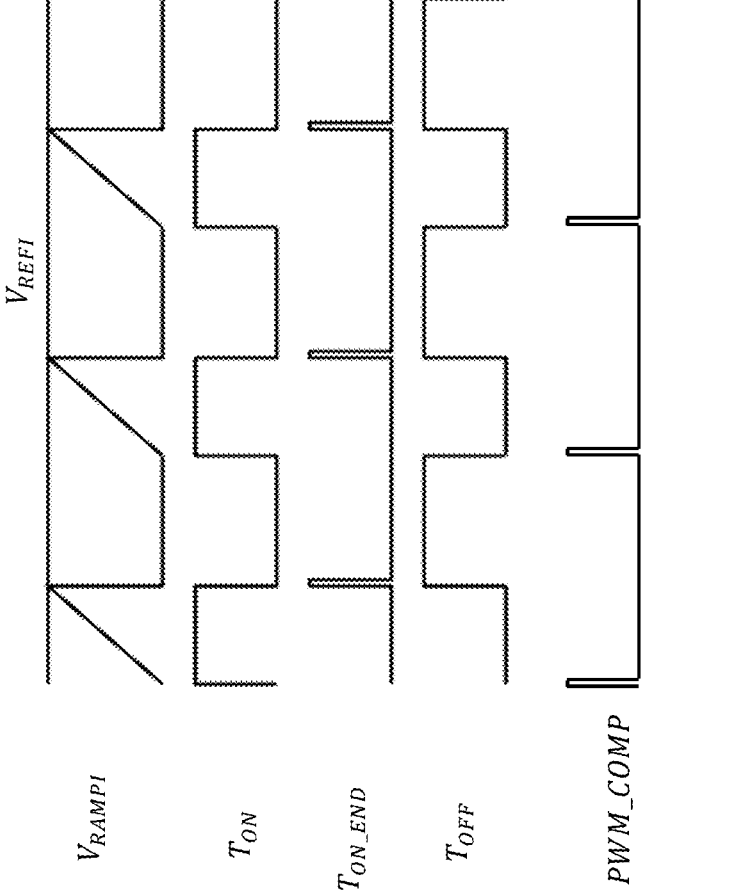
FIG. 3 illustrates a timing diagram for the pulse generator of FIG. 2, in an embodiment.

FIG. 3 illustrates a timing diagram for the pulse generator of FIG. 2, in an embodiment. As illustrated in FIG. 3, the pulse width of the $T_{ON}$ signal is determined by the time it takes for the voltage across the capacitor 155 in FIG. 2 to increase linearly from zero to the voltage $V_{REFI}$. In other words, how quickly the capacitor 155 is charged by the mirror current $I_m$ determines the pulse width of the $T_{ON}$ signal. One skilled in the art will readily appreciate that given the capacitance of the capacitor 155, the pulse width of the $T_{ON}$ signal is adjustable by adjusting the resistance $R_{RON}$ of the resistor 125. A larger resistance for the resistor 125 results in a smaller mirror current $I_m$ and a larger pulse width for the $T_{ON}$ signal, and conversely, a smaller resistance for the resistor 125 results in a larger mirror current $I_m$ and a smaller pulse width for the $T_{ON}$ signal, in some embodiments.

In order to achieve stability of the Buck converter, the control circuit for the Buck converter may need information regarding the output voltage of the Buck converter and/or the switching frequency of the Buck converter. The switching frequency of the Buck converter is the frequency at which the switch 109 is turned ON and OFF during operation, in some embodiments. The switching frequency of the Buck converter may be calculated as $$\frac{1}{P_{TON} + P_{TDFF}},$$

where $P_{TON}$ is the duration of a positive pulse in the $T_{ON}$ signal (see, e.g., FIG. 3), and $P_{TOFF}$ is the duration of a positive pulse in the $T_{OFF}$ signal (see, e.g., FIG. 3). While $P_{TON}$ may be easily derived, the switching frequency $f_{sw}$ of the Buck converter is determined by various system parameters and may be given as:

$$f_{sw} = \frac{1}{P_{TON} \times (1 + \frac{V_{IN} - I_{LOAD} \times R_{HS} - I_{LOAD} \times DCR - V_{OUT}}{V_{OUT} + I_{LOAD} \times R_{LS} + I_{LOAD} \times DCR})} \quad (1)$$

where $V_{IN}$ is the voltage at the pin $V_{IN}$, $V_{OUT}$ is the target Buck converter output voltage, $R_{HS}$ is the resistance of the high-side switch 109, $R_{LS}$ is the resistance of the low-side switch 131, DCR is the equivalent serial resistance of the inductor $L_o$, and $I_{LOAD}$ is the load current.

However, the output voltage of the Buck converter and the switching frequency of the Buck converter may not be readily available for the control circuit. In addition, for the design of IC device 110, it is advantageous to keep the number of pins of the IC device 110 low to keep the design simple and cost effective. Therefore, it may be advantageous to design the control circuit that could receive combined information regarding the output voltage and switching frequency of the Buck converter using less pins. In some embodiments, the resistance $R_{RON}$ of the resistor 125 in FIG. 1 is given by:

$$R_{RON} = \frac{K_{RON} \times V_{OUT}}{f_{SW}} \quad (2)$$

where $V_{OUT}$ is the target output voltage of the Buck converter in unit of volt, $f_{sw}$ is the target switching frequency of the Buck converter in unit of kHz, $K_{RON}$ is a constant, and $R_{RON}$ is in unit of kΩ. In some embodiments, the resistance $R_{RON}$ is in a range between a few kilo-Ohms to a few hundred kilo-Ohms, and the constant $K_{RON}$ is defined to keep the resistance $R_{RON}$ within this range for all switching frequencies and output voltages within the design specification of the Buck converter. The resistance $R_{RON}$ in Equation (2) determines the pulse width of the $T_{ON}$ signal based on combined information regarding the output voltage and switching frequency of the Buck converter. The choice of resistance $R_{RON}$ of the resistor 125 in Equation (2) reduces the pin count of the IC device 110 while achieving improved stability for the Buck converter.

From the discussion above, skilled artisans will ready appreciate that among other factors, the compensation ramp voltage 120 generated by the ramp signal generator 119 to a large extent determines the switching behavior and performance of the Buck converter. In order to achieve good control of the Buck converter during steady state, the compensation ramp voltage 120 (e.g., generated when the switch 185 is closed) should have a large enough amplitude to avoid jitter due to the precision of the comparator 121. In addition, the gradient (also referred to as slope) of the compensation ramp voltage 120 should be in a specific range. In particular, the inventors of this application have found that, given a target output voltage ripple $\Delta V_{OUT}$ (e.g., ripple in the output voltage $V_{OUT}$) of the Buck converter and a target switching frequency $f_x$ of the Buck converter, a gradient $S_x$ (also referred to as a slope) of the compensation ramp voltage 120 is given by:

$$S_x > K \times \frac{\Delta V_{OUT}}{t_x} \quad (3)$$

where $t_x = 1/f_x$ is the switching period of the Buck converter, and K is a multiplication factor have a value between about 1.5 and about 5. The value of K may be found by, e.g., performing simulation and analysis of the Buck converter. In the illustrate embodiments, the output voltage ripple $\Delta V_{OUT}$ is the same as the feedback voltage ripple $\Delta V_{FB}$ (e.g., ripple in the feedback voltage 136) of the Buck converter, thanks to the feedforward capacitor $C_{FF}$. In other words, $\Delta V_{OUT} = \Delta V_{FB}$ in the illustrated embodiments.

As shown in Equation (3), the needed slope value for the compensation ramp voltage 120 scales with the switching frequency $f_x$ proportionally. However, the switching frequency $f_x$ may not be known in the control circuit of FIG. 1. A solution to this challenge is to use an open-loop generated compensation ramp voltage with a slope that changes in time, so that for low steady state switching period (or high switching frequency), the compensation ramp voltage 120 has a higher slope, and for high steady state switching period (or low switching frequency), the compensation ramp voltage 120 has a lower slope.

Figure 4:
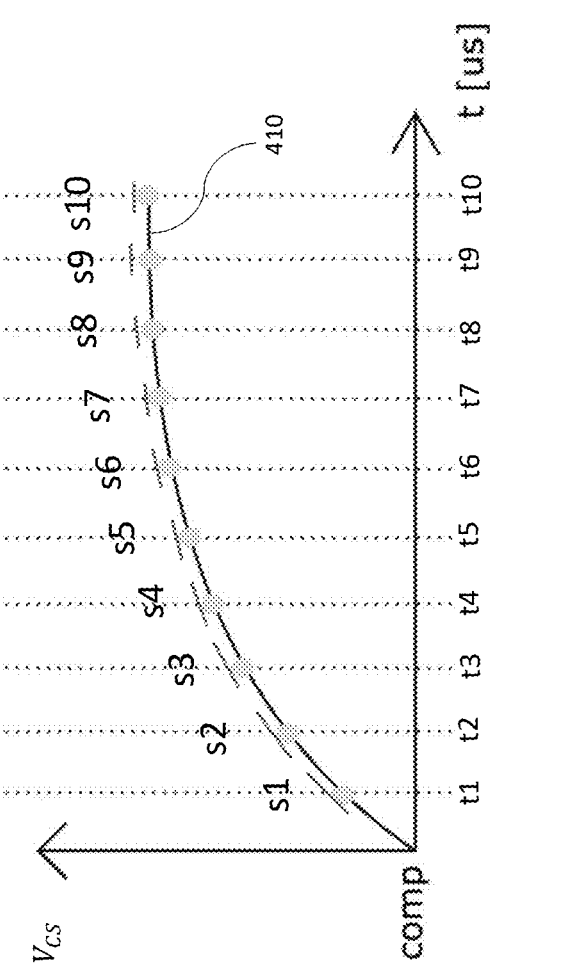
FIG. 4 illustrates a compensation ramp voltage, in an embodiment.

FIG. 4 illustrates a period of a compensation ramp voltage 410, in an embodiment. The compensation ramp voltage 410 may be used as the compensation ramp voltage 120 of FIG. 1 when the switch 185 is closed.

In FIG. 4, the compensation ramp voltage 410 is designed to cover switching period (which is the inverse of switching frequency) in a range from, e.g., $t_1$ to $t_{10}$. For example, at the switching period $t_1$, the slope (or the gradient) of the compensation ramp voltage 410 has a value $S_1$ that satisfies Equation (3), e.g., $$S_1 > K \times \frac{\Delta V_{OUT}}{t_1}.$$

As illustrated in FIG. 4, the compensation ramp voltage 410 is a non-linear voltage signal, and the gradient (or slope) of the non-linear voltage signal decreases continuously from the beginning of the non-linear voltage signal to the end of the non-linear voltage signal.

In FIG. 4, the x-axis shows values of time, where each value of time corresponds to a switching period of the Buck converter. For example, the time instant $t_1$ corresponds to a switching period $t_1$ (or equivalently, a switching frequency $1/t_1$) of the Buck converter. The y-axis shows the value of the compensation ramp voltage 410. The line segments at switching period $t_1$ to $t_{10}$ illustrate the corresponding gradients (or slopes) at those switching periods. In some embodiments, during steady state operation of the Buck converter, the voltage COMP at the output terminal 114 in FIG. 1 is quasi-static (e.g., changing very slowly), such that in tens of, hundreds of, or more switching periods of the Buck converter, the voltage COMP can be treated as if it has a constant value. In some embodiments, the voltage COMP has a quasi-static value of zero in steady state of the Buck converter. Therefore, in FIG. 4, the compensation ramp voltage 410 is shown as a ramp voltage (e.g., generated by the ramp circuit 116 of FIG. 1) added on top of a (constant)

voltage COMP, this is because the ramp signal generator 119 generates the compensation ramp voltage (e.g., 120 in FIG. 1) by adding the ramp voltage to the voltage COMP. An example of ramp signal generator 119 is discussed hereinafter with reference to FIGS. 6A and 6B.

The compensation ramp voltage 410 shown in FIG. 4 illustrates a complete period of the designed compensation ramp voltage. If during the stead state of the Buck converter, the Buck converter switches at the switching frequency $1/t_{10}$ (or equivalently, having a switching period $t_{10}$), then the compensation ramp voltage 120 generated by the ramp signal generator 119 includes repeated complete copies of the compensation ramp voltage 410 (see, e.g., $V_{RAMP}$ in FIG. 5A). However, if during the stead state of the Buck converter, the Buck converter switches at a switching frequency higher than $1/t_{10}$, such as switching at a switching frequency of $1/t_5$ (or equivalently, having a switching period $t_5$), then the compensation ramp voltage 120 generated by the ramp signal generator 119 includes repeated partial copies of the compensation ramp voltage 410 (see, e.g., $V_{RAMP}$ in FIG. 5B), wherein each partial copy includes portions of the compensation ramp voltage 410 up to the switching period $t_5$. Therefore, for the example of FIG. 4, the switching period of the Buck converter is equal to or less than $t_{10}$, and depending on the switching frequency of Buck converter, the ramp signal generator 119 is configured to generate complete copies of the compensation ramp voltage 410, or partial copies (e.g., comprising early portions of the compensation ramp voltage 410 up to time instant $t_x$, $x < 10$).

Figures 5A, 5B:
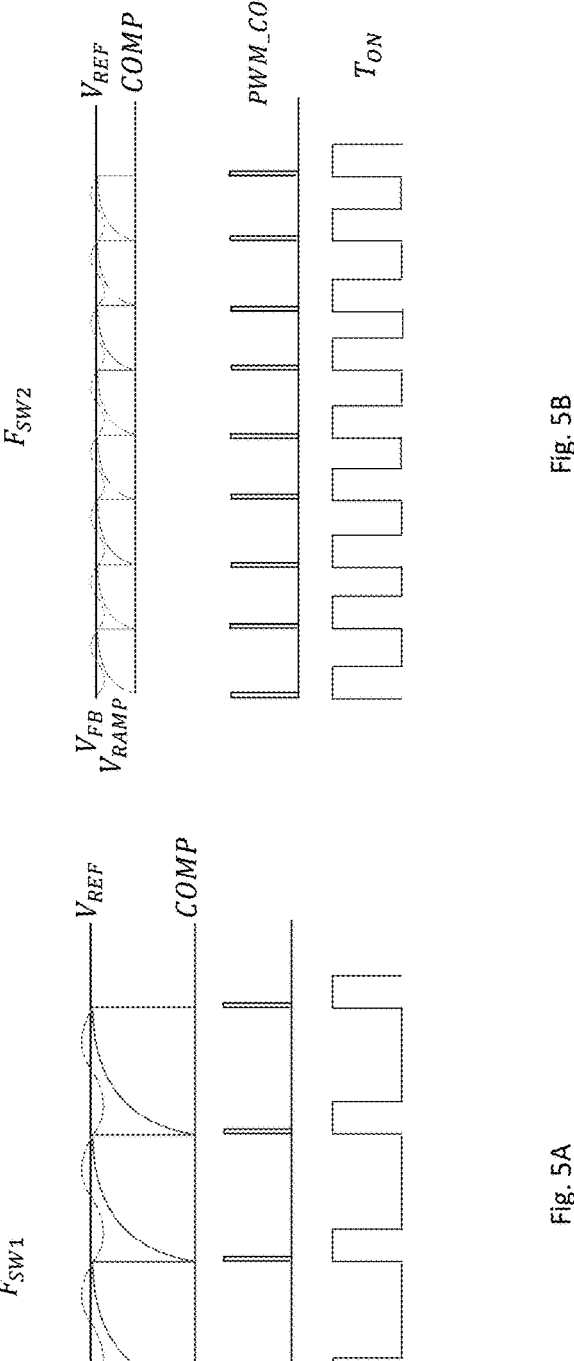
FIGS. 5A and 5B illustrate timing diagrams of the Constant On-Time (COT) Buck converter of FIG. 1 at two different switching frequencies, in an embodiment.

FIGS. 5A and 5B illustrate timing diagrams of the Buck converter of FIG. 1 at two different switching frequencies, in an embodiment. FIG. 5A shows the Buck converter switching at a low switching frequency (e.g., $1/t_{10}$), and FIG. 5B shows the Buck converter switching at a higher switching frequency (e.g., $1/t_5$).

In FIG. 5A, the voltage COMP is illustrated as a constant voltage. The ramp voltage $V_{RAMP}$ is generated by the ramp circuit 116 (see FIG. 1) and added on top of the voltage COMP to form the compensation ramp voltage 120. For ease of discussion, the voltage COMP may be considered as zero, so the ramp voltage $V_{RAMP}$ is considered the same as the compensation ramp voltage 120. The sine wave shaped curve in FIG. 5A illustrates the feedback voltage $V_{FB}$, which oscillates around the constant reference voltage $V_{REF}$. Note that the feedback voltage $V_{FB}$ is illustrated as a sine wave shaped curve for illustration purpose only, the actual shape of the feedback voltage $V_{FB}$ may not be a sine wave. Referring to FIG. 5A and FIG. 1, when the feedback voltage $V_{FB}$ drops below the ramp voltage $V_{RAMP}$, the PWM_COMP signal at the output of the comparator 121 turns to logic HIGH. In response to the rising edge of the PWM_COMP signal, the pulse generator 123 generates a pulse in the $T_{ON}$ signal (e.g., pulse signal 124). The $T_{ON}$ signal is used by the logic circuit 127 to generate the switching control signals 128A and 128B for switching the switches 109 and 131 of the Buck converter. A rising edge in the switching control signal 128A is detected by the edge detector 139 to generate a narrow pulse in the control signal 140. As will be discussed in more details, the narrow pulse in the control signal 140 resets the ramp voltage $V_{RAMP}$ to zero. As a result, the PWM_COMP signal turns to logic LOW, and the ramp voltage $V_{RAMP}$ starts to increase from zero again, and the process discussed above repeats again.

FIG. 5B is similar to FIG. 5A, but the Buck converter switches at a higher switching frequency. As illustrated in FIG. 5B, due to the higher switching frequency, the ramp voltage $V_{RAMP}$ is a smaller, earlier portion of the compensation ramp voltage 410 in FIG. 4 (e.g., a portion up to time instant $t_5$), whereas the ramp voltage $V_{RAMP}$ in FIG. 5A may be the complete period of the compensation ramp voltage 410 (e.g., the whole compensation ramp voltage 410 up to time instant $t_{10}$).

Figure 6A:
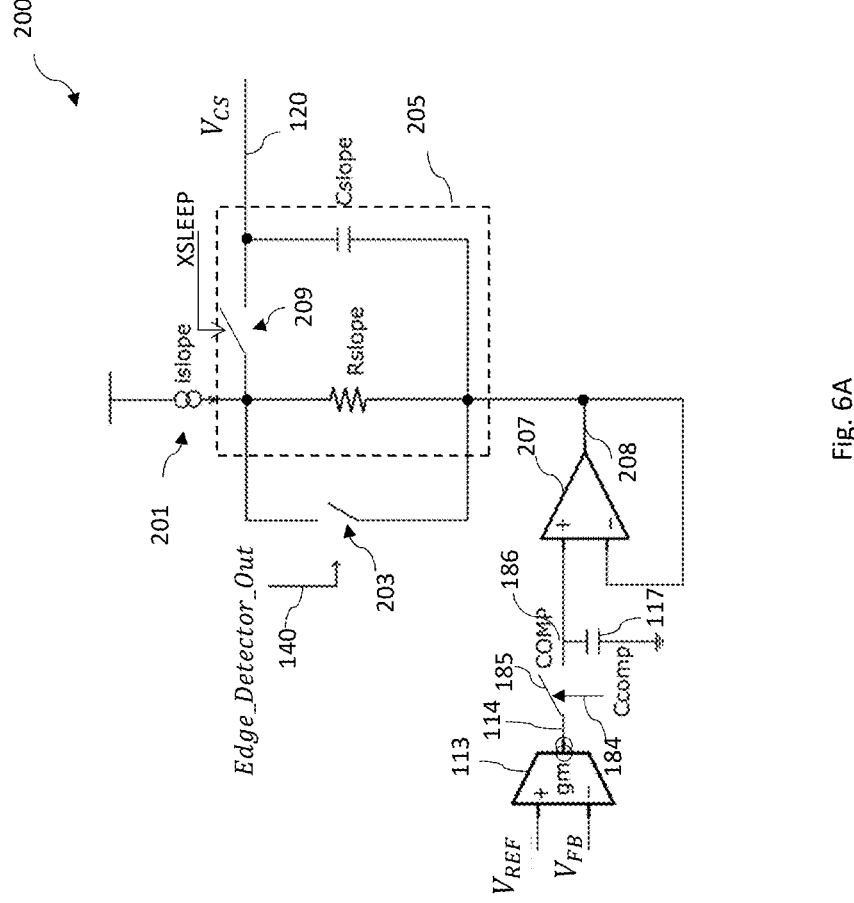
FIGS. 6A and 6B illustrate a block diagram of a ramp signal generator and the corresponding compensation ramp voltage generated by the ramp signal generator, respectively, in an embodiment.
Figure 6B:
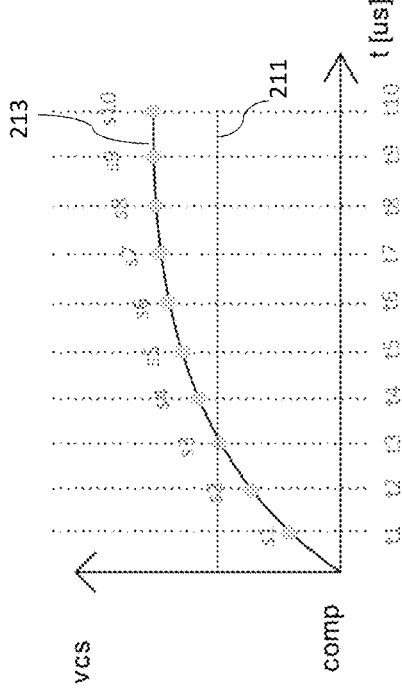

FIGS. 6A and 6B illustrate a block diagram of a ramp signal generator and the corresponding compensation ramp voltage generated by the ramp signal generator, respectively, in an embodiment.

FIG. 6A illustrates a block diagram of a ramp signal generator 200, in an embodiment. The ramp signal generator 200 may be used as the ramp signal generator 119 of FIG. 1. Note that to show the electrical connection of the ramp signal generator 200, the transconductance amplifier 113, the switch 185, and the capacitor 117 in FIG. 1 are also shown in FIG. 6A, with the understanding that the transconductance amplifier 113, the switch 185, and the capacitor 117 are not part of the ramp signal generator 200.

In FIG. 6A, the ramp signal generator 200 includes an operation amplifier 207, a current source 201, a ramp circuit 205, and a switch 203 coupled in parallel to the ramp circuit 205. The ramp circuit 205 corresponds to the ramp circuit 116 of FIG. 1, and the operation amplifier 207 functions as the adder circuit 118 of FIG. 1 to add the ramp voltage generated by the ramp circuit 205 to the voltage at the node 186 to generate the compensation ramp voltage 120.

As illustrated in FIG. 6A, a non-inverting input terminal of the operational amplifier 207 is coupled to the node 186, and an inverting input terminal of the operational amplifier 207 is coupled to an output terminal 208 of the operational amplifier 207. The ramp circuit 205 is coupled between an output terminal of the current source 201 and the output terminal 208 of the operational amplifier 207. In the example of FIG. 6A, the ramp circuit 205 includes an RC filter (e.g., a resistor $R_{slope}$ and a capacitor $C_{slope}$) and a switch 209 coupled between the resistor $R_{slope}$ and the capacitor $C_{slope}$. The switch 209 is controlled by a control signal labeled as XSLEEP, which is the complement of the control signal SLEEP (e.g., the status indicator 161). In some embodiments, the switch 209 is opened when the control signal SLEEP has a logic HIGH value (e.g., a value of 1), and is closed when the control signal SLEEP has a logic LOW value (e.g., a value of 0). When the switch 209 is open, the output of the ramp signal generator 200 is frozen (e.g., held at a fixed value). The switch 203 is coupled in parallel to the ramp circuit 205, and is controlled by the control signal 140 generated by the edge detector 139 in FIG. 1. In some embodiments, the switch 203 is closed when the control signal 140 has a logic HIGH value, and is open when the control signal 140 has a logic LOW value. The switch 203 is used to reset the non-linear ramp voltage generated by the ramp circuit 205.

In the example of FIG. 6A, the current source 201 provides a current $I_{slope}$ having a constant value. When the switch 203 is closed by the control signal 140, the capacitor $C_{slope}$ is discharged, and the ramp voltage is reset to zero. When the switch 203 is open, a portion of the current $I_{slope}$ charges the capacitor $C_{slope}$, and the voltage $V_{ramp}$ across the capacitor $C_{slope}$ (which is the ramp voltage $V_{ramp}$ generated by the ramp circuit) is given by:

$$V_{ramp} = Vramp_f \times (1 - e^{-\frac{t}{\tau}}) \tag{4}$$

where $\tau = C_{slope} \times R_{slope}$, and $Vramp_f = I_{slope} \times R_{slope}$. Note that in the equations above, $I_{slope}$, $R_{slope}$, and $C_{slope}$ are used to represent the value of the current $I_{slope}$, the resistance of the resistor $R_{slope}$, and the capacitance of the capacitor $C_{slope}$, respectively. Equation (4) shows that the compensation ramp voltage 120 generated by the ramp signal generator 200 has an exponential shape.

The gradient $S_x$ of the ramp voltage $V_{ramp}$ in Equation (4) at time instant ty is given by:

$$S_x = \frac{Vramp_f}{\tau} \times e^{\frac{t_x}{\tau}} \qquad (5)$$

Note that since the voltage COMP is quasi-static in steady state, the gradient of the ramp voltage $V_{ramp}$ is the same as the gradient of the compensation ramp voltage 120 in steady state.

In FIG. 6B, the curve 211 shows the value of the current source 201, and the curve 213 shows the compensation ramp voltage 120 as a ramp voltage added on top of the (constant) voltage COMP.

Besides the ramp signal generator 200 in FIG. 6A, other embodiments of the ramp signal generator 119 are possible and are fully intended to be included within the scope of the present disclosure. For example, U.S. patent application Ser. No. 18/334,708 discloses various embodiments of ramp signal generator that may be used as the ramp signal generator 119 of FIG. 1. U.S. patent application Ser. No. 18/334,708 is incorporated herein by reference. In addition, while the discussion herein uses the example of an open-loop generated non-linear ramp voltage without knowledge of the switching frequency of the Buck converter, the principles disclosed herein apply to Buck converter systems where the ramp voltage is generated with knowledge of the switching frequency, e.g., by using phase-locked loop (PLL) for estimating the switching frequency. U.S. patent application Ser. No. 18/334,757 discloses various embodiments of ramp signal generator that uses PLL for estimating the switching frequency and that may be used as the ramp signal generator 119 of FIG. 1. U.S. patent application Ser. No. 18/334,757 is incorporated herein by reference.

Figure 7A:
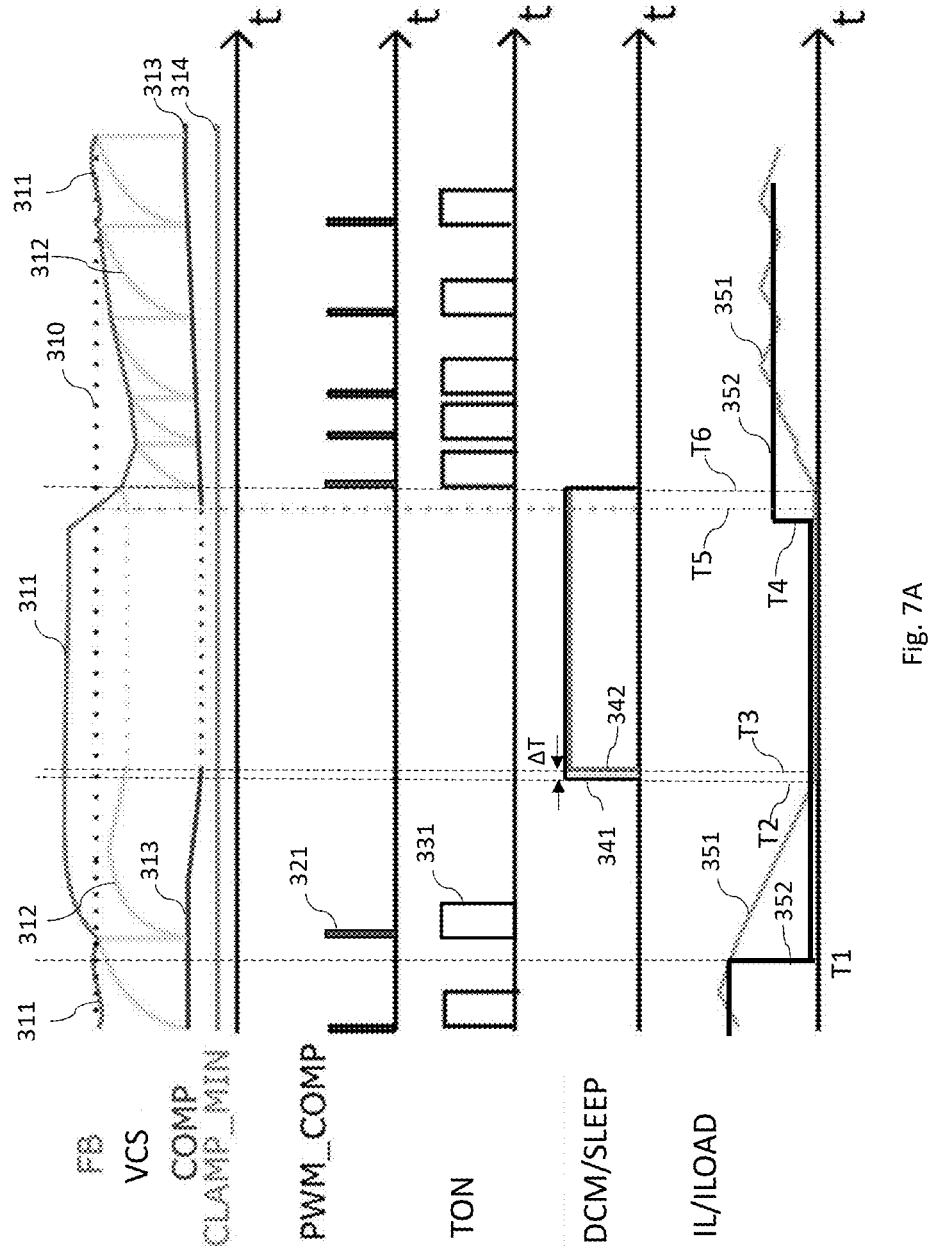
FIG. 7A illustrates a timing diagram of the COT Buck converter of FIG. 1 during load transitions, in an embodiment.

FIG. 7A illustrates a timing diagram of the Buck converter of FIG. 1 during load transitions, in an embodiment. In particular, FIG. 7A illustrates a challenging operating condition for the Buck converter where a sudden release of load is followed with a sudden increase of load. Under such conditions, a conventional Buck converter may experience a large voltage drop in its output voltage after the sudden increase of load, which voltage drop may be larger than a target range allowed by the user or design specification. The control circuit disclosed herein, by switching between different configurations in response to the load transitions, reduces the voltage drop during load transitions while still achieving accurate voltage stability control during steady state, details are discussed below.

In FIG. 7A, the curve 311 (labeled as FB) illustrates the feedback voltage $V_{FB}$, the dashed line 310 (e.g., a straight line) illustrates the reference voltage $V_{REF}$, the curve 312 (labeled as VCS) illustrates the compensation ramp voltage 120, the curve 313 (labeled as COMP) illustrates the voltage COMP, and the curve 314 (labeled as CLAMP_MIN) illustrates the lower limit set by the clamping circuit 115 for the voltage at the node 186. In addition, the curve 321 (labeled as PWM_COMP) illustrates the PWM_COMP signal, the curve 331 (labeled as $T_{ON}$) illustrates pulse signal 124 (e.g., the $T_{ON}$ signal) generated by the pulse generator 123, the curve 341 (having a pulse shape and labeled as DCM)

illustrates the duration of time when the current $I_O$ flowing through the inductor $L_O$ is zero, the curve 342 (having a pulse shape and labeled as SLEEP) illustrates the duration of time when the status indicator 161 is HIGH (e.g., Buck converter is in sleep mode), the curve 351 (labeled as IL) illustrates the current $I_O$ flowing through the inductor $L_O$, and the curve 352 (labeled as $I_{LOAD}$) illustrates the desired load current (or equivalently a value proportional to the load).

In the example of FIG. 7A, before time T1, the Buck converter is in a steady state and switches the switches 109 and 131 to provide a target output voltage. At time T1, there is sudden drop in the load because of a load release, as indicated by the sudden drop to zero in the curve 352. As a result, the current $I_O$ (see curve 351) flowing through the inductor $L_O$ starts to drop. Since the load is released (e.g., removed), the current $I_O$ could no longer flow through the load, and instead, charges the capacitor $C_O$, causing the output voltage $V_{OUT}$ (and the feedback voltage $V_{FB}$) to increase, as indicated by the increase in the curve 311 after time T1. Since the feedback voltage $V_{FB}$ now increases above the reference voltage (see curve 310), the control circuit of the Buck converter works in an over-regulated condition, and as a result, the voltage COMP starts to decrease. Since the compensation ramp voltage 120 is the sum of the voltage COMP and the ramp voltage, the decrease in the voltage COMP causes a corresponding decrease in the compensation ramp voltage 120, as indicated by the decrease in the curve 312 after time T1.

At time T2, the current $I_O$ flowing through the inductor $L_O$ reaches zero (e.g., no current flows through the inductor $L_O$). The curve 341 (which may be generated by the mode detection circuit 160) goes HIGH at time T2 to indicate that the Buck converter enters discontinuous conduction mode.

After a pre-determined period of time (e.g., $\Delta T$), at time T3, the curve 342 (which corresponds to the control signal SLEEP) goes HIGH to indicate that the Buck converter enters sleep mode. Once the curve 342 goes HIGH, the switch 185 is opened, and the ramp voltage generator 119 is frozen. As a result, the voltage COMP and the compensation ramp voltage 120 (see curve 312) are kept at fixed values starting at time T3.

At time T4, a load is connected, causing a sudden increase in the load. As a result, the output voltage $V_{OUT}$ (and the feedback voltage $V_{FB}$) starts to decrease.

At time T5, the feedback voltage $V_{FB}$ drops below the reference voltage $V_{REF}$. The comparator 181 detects that the feedback voltage $V_{FB}$ drops below the reference voltage $V_{REF}$, and generates a logic HIGH value for the WAKE-UP signal, which causes the compensation control circuit 183 to close the switch 185 at time T5. The ramp signal generator 119 is un-frozen (e.g., starts running) at time T5, in some embodiments.

At time T6, the feedback voltage $V_{FB}$ drops below the compensation ramp voltage 120. This is detected by the comparator 121, and a pulse is generated in the PWM_COMP signal, which in turn causes a pulse being generated in the $T_{ON}$ signal, as illustrated in FIG. 7A. Therefore, the Buck converter starts switching the switches 109 and 131 at time T6, and the current $I_O$ starts to flow through the inductor $I_O$ (e.g., current increases above zero). The current $I_O$ flowing through the inductor $I_O$ is detected by the mode detection circuit 160, and the status indicator 161 (the control signal SLEEP) and the curve 341 are set to logic LOW values, indicating that the Buck converter gets out of the sleep mode at time T6. The feedback voltage $V_{FB}$ of the Buck converter starts to increase after time T6, and settles around the target value (e.g., the reference voltage $V_{REF}$) shortly after.

Note that by opening the switch 185 and freezing the output of the ramp signal generator 119, the compensation ramp voltage 120 (see curve 312) is held at a fixed value when the Buck converter is in sleep mode, instead of decreasing if switch 185 is closed. This reduces the time delay between the time T5 and the time T6, which in turn reduces the drop in the Buck converter output voltage after the load is suddenly increased. Without the disclosed control circuit architecture and operating method, the voltage drop may be larger than what is allowed by the user or design specification. The presently disclosed control circuit architecture and operating method effectively reduces the voltage drop, and ensures that the voltage drop during load transitions is within a small range allowed, even in challenging operating conditions. At the same time, the V2COT architecture ensures that in steady state, accurate stability control is achieved.

Figure 7B:
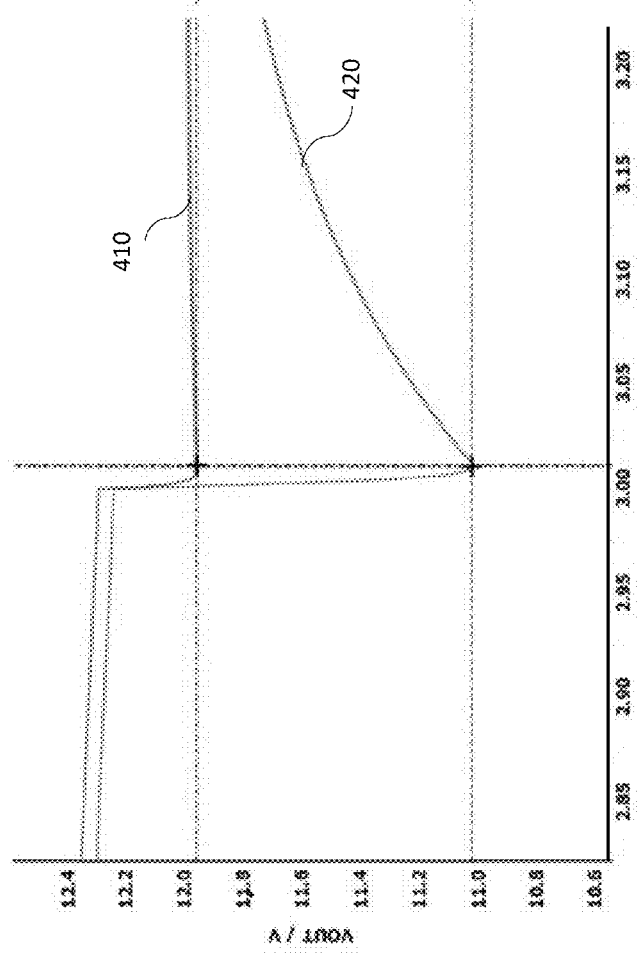
FIG. 7B illustrates the performance of the COT Buck converter of FIG. 1 during load transitions, in an embodiment.

Simulations have been performed to study the performance of the disclosed Buck converter herein and a reference Buck converter without the disclosed control circuit architecture. FIG. 7B illustrates the simulated performance of the COT Buck converter of FIG. 1 and the reference Buck converter during load transitions, in an embodiment. In particular, curves 410 and 420 in FIG. 7B illustrate the performance of the COT Buck converter of FIG. 1 and the reference Buck converter without the disclosed control circuit architecture, respectively. The x-axis in FIG. 7B indicates time, and the y-axis in FIG. 7B indicates the output voltage of the Buck converter. In a test configuration, the input voltage is 48 V, the target output voltage is 12V, and the target switching frequency is 1 MHz. There was a load release followed by a sudden addition of a load, similar to the condition illustrated in FIG. 7A. The current in the inductor $L_O$ decrease from 1 A to 1 mA in about 100 ns during the load release. The maximum voltage variation (e.g., undershoot or overshoot) in the target output voltage when recovering from the sleep mode is measured. The reference Buck converter without the presently disclosed control circuit architecture and operation method has a voltage drop of 8.6% of the target output voltage, which is above the +5% voltage ripple typically allowed in Buck converter design. In contrast, the Buck converter with the presently disclosed control circuit architecture and operation method only has a 2.5% drop in the output voltage, which is within the allowed range.

Figure 8:
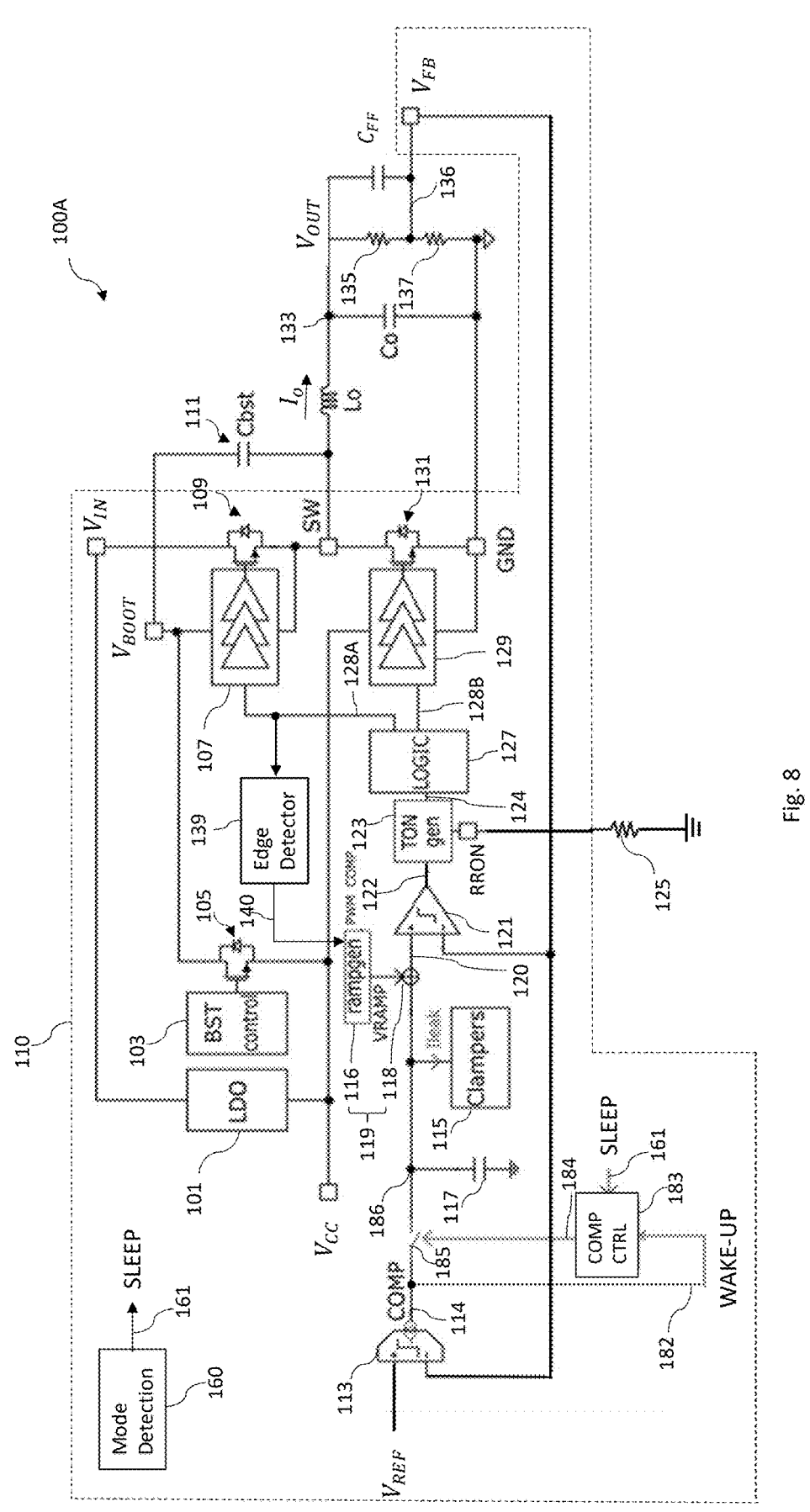
FIG. 8 illustrates a block diagram of a switched-mode power supply (SMPS), in another embodiment.

FIG. 8 illustrates a block diagram of a switched-mode power supply (SMPS) 100A, in another embodiment. The SMPS 100A is similar to the SMPS 100 in FIG. 1, and is an alternative implementation of the same principle of the SMPS 100. For example, when the Buck converter of the SMPS 100A enters the sleep mode, the switch 185 is open, the output of the ramp signal generator 119 is frozen, and the clamping circuit 115 sets a lower limit for the voltage COMP. After the switch 185 is open, the control circuit closes the switch 185 when the feedback voltage $V_{FB}$ drops below the reference voltage $V_{REF}$.

Note that compared with the SMPS 100, the SMPS 100A does not use the comparator 181 to generate the output signal 182 (the WAKE-UP signal). Instead, the output terminal 114 of the transconductance amplifier 113 is connected to the second input terminal of the compensation control circuit 183. In other words, when the switch 185 is open, the transconductance amplifier 113 is used as a comparator to generate the WAKE-UP signal. Skilled artisans will appreciate that the transconductance amplifier 113 has a high direct-current (DC) gain and a high output impedance. When the switch 185 is open, the transconductance amplifier 113 acts as a high-gain, high bandwidth device, and the output current of the transconductance amplifier 113 is converted to a voltage by the output impedance. Due to the high DC gain, the voltage at the output terminal 114 of the transconductance amplifier 113 is, e.g., either zero or $V_{CC}$, depending on which of the reference voltage $V_{REF}$ and the feedback voltage $V_{FB}$ is higher. Therefore, the transconductance amplifier 113 functions as a comparator when the switch 185 is open. The SMPS 100A therefore achieves the same performance advantages as the SMPS 100, but uses one less comparator, thus may reduce system cost and power consumption.

Figure 9:
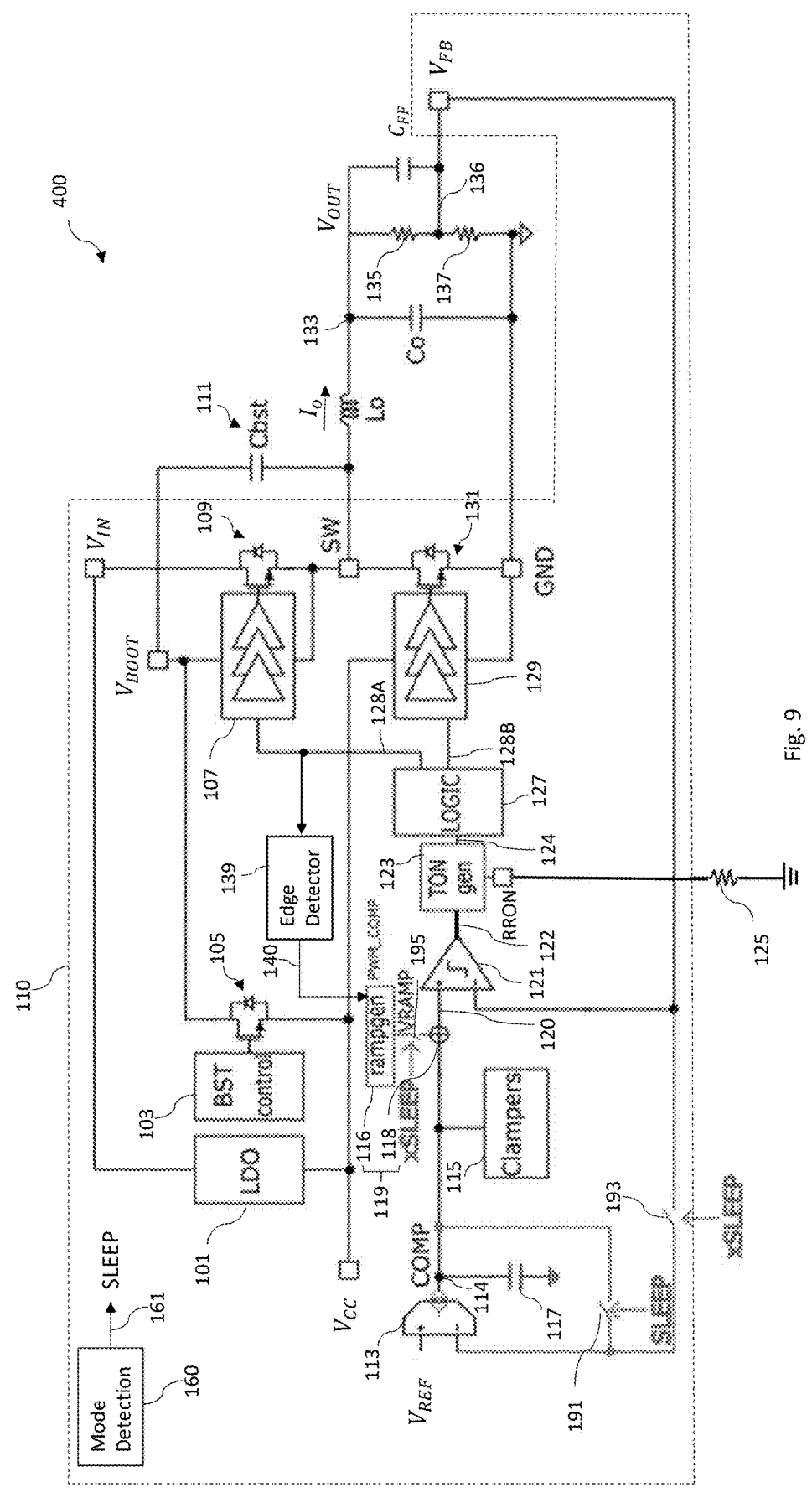
FIG. 9 illustrates a block diagram of a switched-mode power supply (SMPS), in another embodiment.

FIG. 9 illustrates a block diagram of a switched-mode power supply (SMPS) 400, in another embodiment. The SMPS 400 is similar to the SMPS 100, but without the switch 185 coupled between the output terminal 114 of the transconductance amplifier 113 and the capacitor 117. Instead, a first switch 195 is coupled between the output terminal of the ramp circuit 116 and the adder circuit 118, a second switch 191 is coupled between the inverting input terminal of the transconductance amplifier 113 and the output terminal of the transconductance amplifier 113, and a third switch 193 is coupled between the inverting input terminal of the transconductance amplifier 113 and the inverting input terminal of the comparator 121. The first switch 195 and the third switch 193 are controlled by an XSLEEP signal, which is the complement of the control signal SLEEP (e.g., by inverting the control signal SLEEP). The second switch 191 is controlled by the control signal SLEEP.

The SMPS 400 achieves the same or similar performance advantages as the SMPS 100, but the control circuit of the Buck converter of the SMPS 400 works in a different mode when the Buck converter enters the sleep mode. In particular, when the Buck converter of the SMPS 400 enters the sleep mode, the first switch 195 and the third switch 193 are opened, and the second switch 191 is closed. In addition, the ramp circuit 116 may be frozen or shut down during the sleep mode. By closing the second switch 191, the transconductance amplifier 113 is configured into a buffer mode, such that the voltage at its output terminal 114 is equal to the voltage at its non-inverting input terminal, which is the reference voltage $V_{REF}$. In other words, in sleep mode, the reference voltage $V_{REF}$ is sent (via the adder circuit 118) to the non-inverting input terminal of the comparator 121, and the feedback voltage $V_{FB}$ is sent to the inverting terminal of the comparator 121. With this configuration in sleep mode, only one feedback path (e.g., the fast path) of the control circuit is working, and the control circuit is referred to as working in a COT mode (instead of V2COT mode) in sleep mode. When the Buck converter gets out of the sleep mode, the first switch 195 and the third switch 193 are closed, and the second switch 191 is opened, and the control circuit works in V2COT mode.

Figure 10:
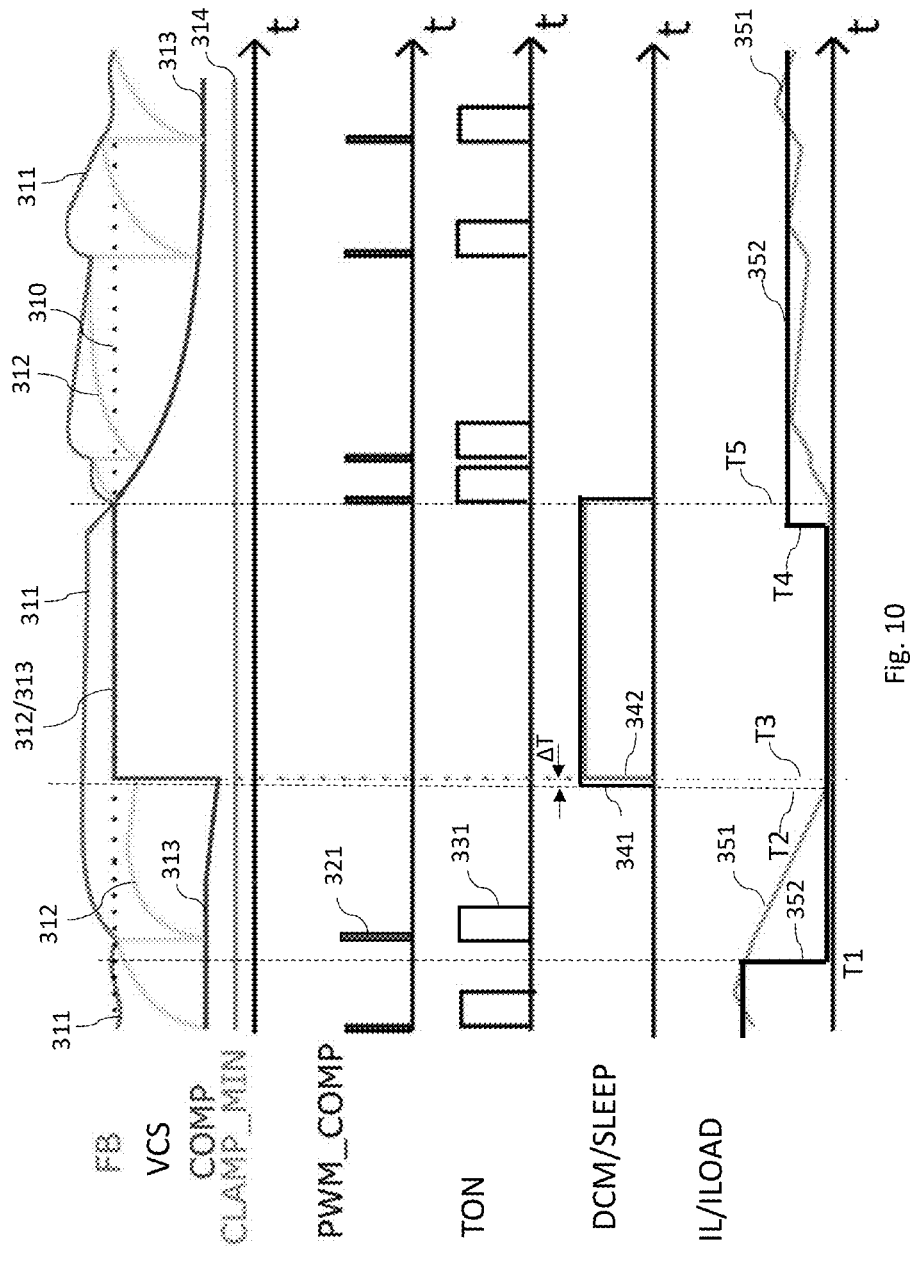
FIG. 10 illustrates a timing diagram of the COT Buck converter of FIG. 9 during load transitions, in an embodiment.

FIG. 10 illustrates a timing diagram of the Buck converter of FIG. 9 during load transitions, in an embodiment. The signal names and notations are the same as those of FIG. 7A. Similar to FIG. 7A, FIG. 10 illustrates a challenging working condition where the load is released at time T1, and later, at time T4, a load is suddenly added.

As illustrated in FIG. 10, at time T1, the load is released. As a result, the current $I_O$ flowing through the inductor $L_O$ (see curve 351) starts to decrease, and the feedback voltage $V_{FB}$ increases due to the current $I_O$ charging the capacitor $C_O$. Since the feedback voltage $V_{FB}$ increases above the reference voltage $V_{REF}$, the control circuit works in an over-regulating condition. As a result, the voltage COMP starts to decreases, and in turn, the compensation ramp voltage 120 (see curve 312) decrease with the voltage COMP.

A time T2, the current $I_O$ flowing through the inductor $L_O$ drops to zero, and the DCM signal (see curve 341) goes HIGH.

At time T3, the control signal SLEEP goes HIGH to indicate that the Buck converter enters the sleep mode. In response to the control signal SLEEP going HIGH, the control circuit opens the first switch 195 and the third switch 193, and closes the second switch 191. As a result, the voltage COMP and the compensation ramp voltage 120 (see curve 312) are equal to the reference voltage $V_{REF}$ (see curve 310) after time T3.

At time T4, a load is suddenly added, which causes the feedback voltage $V_{FB}$ to drop.

At time T5, the feedback voltage $V_{FB}$ drops below the reference voltage $V_{REF}$ (which is equal to the compensation ramp voltage 120 at time T5). As a result, the control signal SLEEP goes LOW, indicating that the Buck converter gets out of the sleep mode. In response to the control signal SLEEP going LOW, the control circuit closes the first switch 195 and the third switch 193, and opens the second switch 191. The Buck converter starts switching the switches 109 and 131, and current starts to flow through the inductor $L_O$. The ramp signal generator 119 is un-frozen (e.g., starts running) at time T5, in some embodiments. Shortly after time T5, the feedback voltage $V_{FB}$ settles around the reference voltage $V_{REF}$.

In the example of FIG. 10, due to the compensation ramp voltage 120 being held at the value of the reference voltage $V_{REF}$ in sleep mode, the time delay between time T4 and time T5 (which is the time it takes for the feedback back voltage $V_{FB}$ to drop below the reference voltage $V_{REF}$) is reduced. As a result, the variation (e.g., undershoot, or overshoot) in the output voltage of the Buck converter before the Buck converter reaches steady state is reduced, thus improving the load transient performance of the Buck converter.

Figure 11:
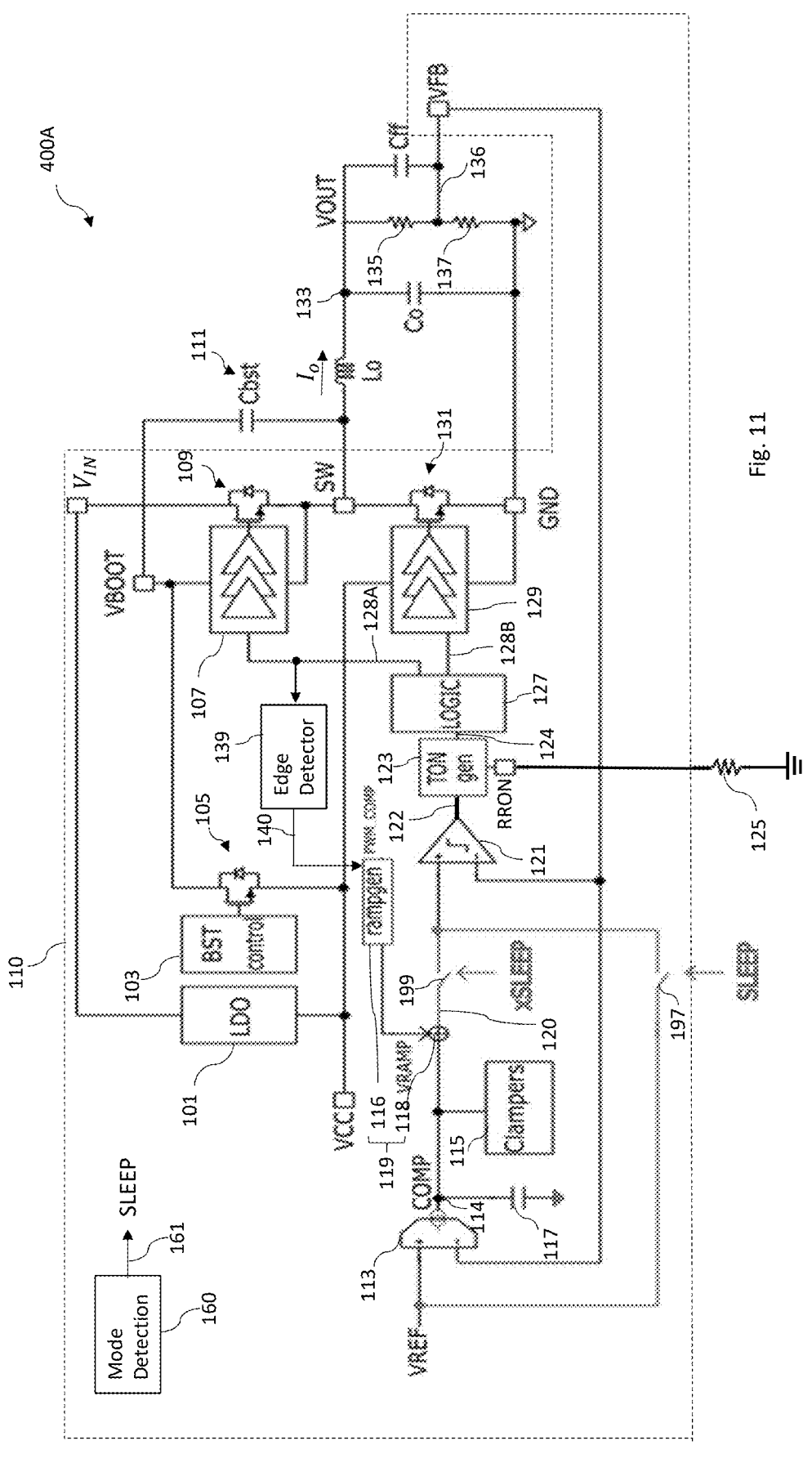
FIG. 11 illustrates a block diagram of a switched-mode power supply (SMPS), in yet another embodiment.

FIG. 11 illustrates a block diagram of a switched-mode power supply (SMPS) 400A, in yet another embodiment. The SMPS 400A is similar to the SMPS 400 in FIG. 9, and is an alternative implementation of the same principle of the SMPS 400.

In the illustrated embodiment of FIG. 11, a switch 199 is coupled between the output terminal of the adder circuit 118 and the non-inverting input terminal of the comparator 121, and a switch 197 is coupled between the non-inverting input terminal (which is connected to the reference voltage $V_{REF}$) of the transconductance amplifier 113 and the non-inverting input terminal of the comparator 121. The switch 199 is controlled by the XSLEEP signal, and the switch 197 is controlled by the control signal SLEEP.

In some embodiments, when the Buck converter of FIG. 11 enters the sleep mode, the switch 199 is opened, and switch 197 is closed. In addition, the ramp signal generator 119 may be frozen or shut down during the sleep mode. By closing the switch 197, the reference voltage $V_{REF}$ is sent directly to the non-inverting input terminal of the comparator 121, and the control circuit of the SMPS 400A works in COT mode when the Buck converter is in the sleep mode. After the switch 199 is opened and the switch 197 is closed, when the feedback voltage $V_{FB}$ drops below the reference voltage $V_{REF}$ (e.g., ending of the sleep mode), the control circuit closes the switch 199 and opens switch 197. The ramp signal generator 119 starts running. As a result, the control circuit works in V2COT mode, and the Buck converter starts switching the switches 109 and 131.

Note that for the SMPS 400, when the Buck converter enters the sleep mode, the reference voltage $V_{REF}$ is sent indirectly (e.g., through the transconductance amplifier 113 configured in buffer mode) to the non-inverting input terminal of the comparator 121. In contrast, for the SMPS 400A, the reference voltage $V_{REF}$ is sent directly to the non-inverting input terminal of the comparator 121 in sleep mode. Since the reference voltage $V_{REF}$ usually is directly trimmed or very precise as a consequence of bandgap voltage trimming, its variation across temperature is limited. Therefore, the reference voltage $V_{REF}$ at the non-inverting input terminal of the comparator 121 of the SMPS 400A is more accurate and less susceptible to temperature induced variations than that of the SMPS 400. In addition, the SMPS 400A uses two switches (e.g., 199 and 197) instead of three switches (e.g., 195, 191, and 193) to support the change in the configuration of the control circuit when going into and out of the sleep mode.

Figure 12:
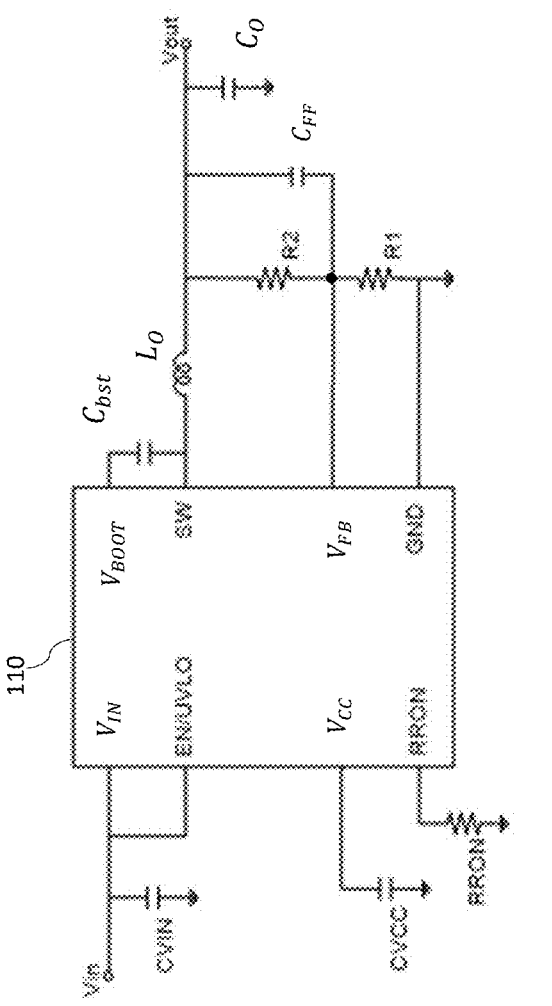
FIG. 12 illustrates the pins of an integrated circuit (IC) device implementing the IC device of the disclosed SMPS, in an embodiment.

FIG. 12 illustrates the pins of an integrated circuit (IC) device implementing the IC device 110 of the disclosed SMPS, in an embodiment. As illustrated in FIG. 12, the number of pins used for the IC device 110 is very small, e.g., only 8 pins, which reduces the cost of manufacturing and the cost of deploying the IC device 110 in the field. The pins in FIG. 12 match the pins shown in FIG. 1 by the pin names. Note that FIG. 12 illustrates an extra pin (e.g., the enable pin EN/UVLO) than FIG. 1, which enable pin EN/UVLO is used for enabling or disabling the IC device 110. The number of external components needed for the IC device 110 is also very limited, as illustrated in FIG. 12. Two capacitors CVIN and CVCC are used to filter out high frequency component of the supply voltage at pins $V_{in}$ and $V_{cc}$. Other external components are discussed in FIG. 1, thus not discussed here.

Figure 13B:
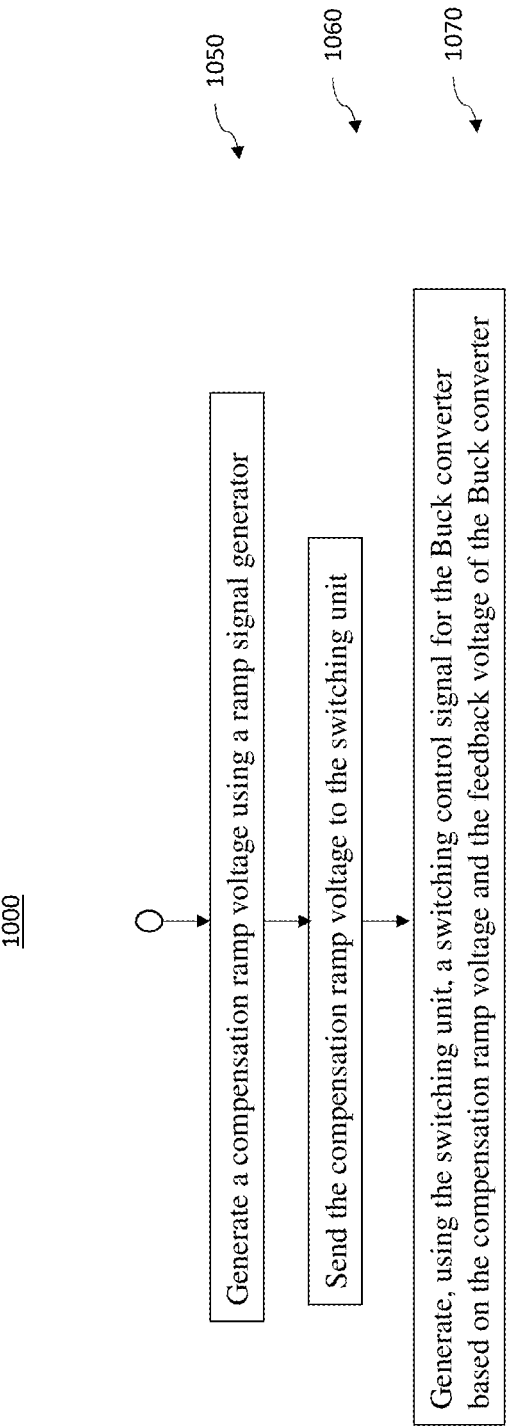

FIGS. 13A and 13B together illustrate a flow chart of a method 1000 of operating a Buck converter, in some embodiments. It should be understood that the example method shown in FIGS. 13A and 13B is merely an example of many possible example methods. One of ordinary skill in the art would recognize many variations, alternatives, and modifications. For example, various steps as illustrated in FIGS. 13A and 13B may be added, removed, replaced, rearranged, or repeated.

Referring to FIGS. 13A and 13B, at block 1010, a feedback voltage is generated based on an output voltage of the Buck converter. At block 1020, the feedback voltage is sent to a switching unit for the Buck converter. At block 1030, the feedback voltage and a reference voltage are sent to a first input terminal of a transconductance amplifier and a second input terminal of the transconductance amplifier, respectively, wherein a switch is coupled between an output terminal of the transconductance amplifier and a first node, wherein the switching unit is coupled between the first node and the Buck converter. At block 1040, in response to detecting that no current has flowed through an inductor of the Buck converter for a pre-determined period of time, the switch is opened. At block 1050, a compensation ramp voltage is generated using a ramp signal generator. At block 1060, the compensation ramp voltage is sent to the switching unit. At block 1070, a switching control signal for the Buck converter is generated based on the compensation ramp voltage and the feedback voltage of the Buck converter using the switching unit.

Embodiments may achieve advantages as described below. For example, the disclosed control circuit for the COT Buck converter does not require direct information of the output voltage and switching frequency, thereby reducing the number of pins needed for the IC device 110 that integrates the Buck converter and the control circuit. A combination of the output voltage and switching frequency is supplied to the pin RRON of the IC device 110 to determine the pulse width of the $T_{ON}$ signal. In the feedback path, besides the voltage divider, only a non-dissipative capacitor $C_{FF}$ (which is optional) is used, which reduces power consumption and improves the power efficiency of the Buck converter. In addition, during stead state operation, the control circuit of the Buck converter performs stability control through two feedback paths: a fast path that provides a feedback voltage $V_{FB}$ directly to the PWM comparator 121, and a slow path that achieves better accuracy by providing a new set point for the PWM comparator 121. The compensation ramp voltages generated by the disclosed ramp signal generators achieves stability of the Buck converter over a wide range of output voltage ripple and switching frequency. When there are load transitions, the control circuit of the Buck converter is re-configured to support quick recovery from sleep mode, which reduces overshoot/undershoot in the Buck convert output voltage during the recovery from sleep mode. Therefore, the disclosed Buck convert also achieves improved performance during load transitions.

Examples of the present invention are summarized here. Other examples can also be understood from the entirety of the specification and the claims filed herein.

Example 1. In accordance with an embodiment, a switched-mode power supply (SMPS) includes: a Buck converter; and a control circuit for the Buck converter, comprising: a switching unit configured to generate a switching control signal that controls switching of the Buck converter, the switching control signal being generated based on a feedback voltage of the Buck converter and a compensation ramp voltage; a transconductance amplifier, wherein a first input terminal of the transconductance amplifier is configured to receive a reference voltage, and a second input terminal of the transconductance amplifier is configured to receive the feedback voltage; a switch coupled between an output terminal of the transconductance amplifier and a first node, wherein the switching unit is coupled between the first node and the Buck converter; a compensation control circuit coupled to a control terminal of the switch and configured to open or close the switch based on a first signal representative of a current flowing through an inductor of the Buck converter, the compensation control circuit receiving the first signal at its first input terminal; and a ramp signal generator configured to generate the compensation ramp voltage.

Example 2. The SMPS of Example 1, wherein the compensation control circuit is configured to: open the switch when no current flows through the inductor of the Buck converter for a pre-determined period of time; and after opening the switch, close the switch when the feedback voltage drops below the reference voltage.

Example 3. The SMPS of Example 2, wherein the ramp signal generator comprises a ramp circuit and is configured to generate the compensation ramp voltage by adding a first voltage at the first node and a second voltage generated by the ramp circuit, wherein the ramp circuit is configured to generate a ramp voltage as the second voltage when the switch is closed, and is configured to hold the second voltage at a fixed value when the switch is open, wherein the fixed value is a value of the ramp voltage at the moment when the compensation control circuit opens the switch.

Example 4. The SMPS of Example 3, wherein the control circuit of the Buck converter further comprises a clamping circuit coupled to the first node and configured to limit a minimum value of the first voltage at the first node to a pre-determined voltage value.

Example 5. The SMPS of Example 3, wherein the ramp voltage is a non-linear voltage signal, wherein in a switching period of the Buck converter, a gradient of the non-linear voltage signal decreases continuously from a beginning of the non-linear voltage signal to an end of the non-linear voltage signal.

Example 6. The SMPS of Example 1, wherein the control circuit for the Buck converter further comprises a mode detection circuit configured to generate the first signal, wherein an output terminal of the mode detection circuit is coupled to the first input terminal of the compensation control circuit.

Example 7. The SMPS of Example 1, wherein the control circuit for the Buck converter further comprises a comparator configured to compare the feedback voltage with the reference voltage, wherein an output terminal of the comparator is coupled to a second input terminal of the compensation control circuit.

Example 8. The SMPS of Example 1, wherein a second input terminal of the compensation control circuit is coupled to the output terminal of the transconductance amplifier.

Example 9. The SMPS of Example 1, wherein the switching unit comprises: another comparator configured to compare the compensation ramp voltage applied at a first input terminal of the another comparator with the feedback voltage of the Buck converter applied at a second input terminal of the another comparator; a pulse generator coupled to an output terminal of the another comparator and configured to generate a pulse signal in response to rising edges in an output signal of the another comparator; a logic circuit coupled to an output terminal of the pulse generator and configured to generate, based on the pulse signal, the switching control signal; and a first capacitor coupled between the first node and an electrical ground node.

Example 10. The SMPS of Example 9, further comprising an edge detector coupled between the logic circuit and the ramp signal generator, wherein the edge detector is configured to generate a control signal for the ramp signal generator by detecting a rising edge in the switching control signal.

Example 11. The SMPS of Example 1, wherein the Buck converter has a constant On-Time operation mode.

Example 12. In accordance with an embodiment, an integrated circuit (IC) device includes: a Buck converter; and a control circuit for the Buck converter, comprising: a comparator configured to generate a comparator output signal by comparing a first voltage applied at a first input terminal of the comparator with a feedback voltage of the Buck converter applied at a second input terminal of the comparator; a pulse generator configured to generate a pulse signal in response to rising edges in the comparator output signal, wherein the Buck converter is configured to be controlled by the pulse signal; a transconductance amplifier configured to generate, at an output terminal of the transconductance amplifier, a current proportional to a difference between a reference voltage applied at a first input terminal of the transconductance amplifier and a second voltage applied at a second input terminal of the transconductance amplifier; a first capacitor coupled between the output terminal of the transconductance amplifier and an electrical ground node; a ramp circuit configured to generate, at an output terminal of the ramp circuit, a ramp voltage; an adder circuit; a first switch coupled between the output terminal of the ramp circuit and a first input terminal of the adder circuit, wherein a second input terminal of the adder circuit is coupled to the output terminal of the transconductance amplifier, and an output terminal of the adder circuit is coupled to the first input terminal of the comparator; a second switch coupled between the output terminal of the transconductance amplifier and the second input terminal of the transconductance amplifier; and a third switch coupled between the second input terminal of the transconductance amplifier and the second input terminal of the comparator.

Example 13. The IC device of Example 12, wherein during operation of Buck converter, the first switch and the third switch are configured to be opened and the second switch is configured to be closed after no current flows through an inductor of the Buck converter for a pre-determined period of time.

Example 14. The IC device of Example 13, wherein during operation of the Buck converter, the first switch and the third switch are configured to be closed and the second switch is configured to be opened when the feedback voltage of the Buck converter drops below the first voltage applied at the first input terminal of the comparator.

Example 15. The IC device of Example 12, wherein the control circuit of the Buck converter further comprises a clamping circuit coupled to the output terminal of the transconductance amplifier, wherein the clamping circuit is configured to set a lower limit for a voltage at the output terminal of the transconductance amplifier.

Example 16. In accordance with an embodiment, a method of operating a Buck converter includes: generating a feedback voltage based on an output voltage of the Buck converter; sending the feedback voltage to a switching unit for the Buck converter; sending the feedback voltage and a reference voltage to a first input terminal of a transconductance amplifier and a second input terminal of the transconductance amplifier, respectively, wherein a switch is coupled between an output terminal of the transconductance amplifier and a first node, wherein the switching unit is coupled between the first node and the Buck converter; in response to detecting that no current has flowed through an inductor of the Buck converter for a pre-determined period of time, opening the switch; generating a compensation ramp voltage using a ramp signal generator; sending the compensation ramp voltage to the switching unit; and generating, using the switching unit, a switching control signal for the Buck converter based on the compensation ramp voltage and the feedback voltage of the Buck converter.

Example 17. The method of Example 16, further comprising, after opening the switch: comparing the feedback voltage with the reference voltage; and closing the switch in response to detecting that the feedback voltage drops below the reference voltage.

Example 18. The method of Example 17, wherein generating the compensation ramp voltage comprises: generating a second voltage using a ramp circuit of the ramp signal generator; and adding the second voltage to a first voltage at the first node, wherein the method further comprises limiting a minimum value of the first voltage to a pre-determined voltage value using a clamping circuit.

Example 19. The method of Example 18, wherein when the switch is closed, the ramp circuit is configured to generate a ramp voltage as the second voltage, wherein when the switch is open, the ramp circuit is configured to hold the second voltage at a fixed value, wherein the fixed value is a value of the ramp voltage at the moment when the switch is opened.

Example 20. The method of Example 19, wherein the ramp voltage is a non-linear voltage signal, wherein in a switching period of the Buck converter, a gradient of the non-linear voltage signal decreases continuously from a start of the switching period to an end of the switching period.

While this invention has been described with reference to illustrative examples, this description is not intended to be construed in a limiting sense. Various modifications and combinations of the illustrative examples, as well as other examples of the invention, will be apparent to persons skilled in the art upon reference to the description. It is therefore intended that the appended claims encompass any such modifications or examples.

What is claimed is:

1. A switched-mode power supply (SMPS) comprising:
a Buck converter; and
a control circuit for the Buck converter, comprising:
a switching unit configured to generate a switching control signal that controls switching of the Buck converter, the switching control signal being generated based on a feedback voltage of the Buck converter and a compensation ramp voltage;
a transconductance amplifier, wherein a first input terminal of the transconductance amplifier is configured to receive a reference voltage, and a second input terminal of the transconductance amplifier is configured to receive the feedback voltage;
a switch coupled between an output terminal of the transconductance amplifier and a first node, wherein the switching unit is coupled between the first node and the Buck converter;
a compensation control circuit coupled to a control terminal of the switch and configured to open or close the switch based on a first signal representative of a current flowing through an inductor of the Buck converter, the compensation control circuit receiving the first signal at its first input terminal; and
a ramp signal generator configured to generate the compensation ramp voltage.

2. The SMPS of claim 1, wherein the compensation control circuit is configured to:
open the switch when no current flows through the inductor of the Buck converter for a pre-determined period of time; and
after opening the switch, close the switch when the feedback voltage drops below the reference voltage.

3. The SMPS of claim 2, wherein the ramp signal generator comprises a ramp circuit and is configured to generate the compensation ramp voltage by adding a first voltage at the first node and a second voltage generated by the ramp circuit, wherein the ramp circuit is configured to generate a ramp voltage as the second voltage when the switch is closed, and is configured to hold the second voltage at a fixed value when the switch is open, wherein the fixed value is a value of the ramp voltage at the moment when the compensation control circuit opens the switch.

4. The SMPS of claim 3, wherein the control circuit for the Buck converter further comprises a clamping circuit coupled to the first node and configured to limit a minimum value of the first voltage at the first node to a pre-determined voltage value.

5. The SMPS of claim 3, wherein the ramp voltage is a non-linear voltage signal, wherein in a switching period of the Buck converter, a gradient of the non-linear voltage signal decreases continuously from a beginning of the non-linear voltage signal to an end of the non-linear voltage signal.

6. The SMPS of claim 1, wherein the control circuit for the Buck converter further comprises a mode detection circuit configured to generate the first signal, wherein an output terminal of the mode detection circuit is coupled to the first input terminal of the compensation control circuit.

7. The SMPS of claim 1, wherein the control circuit for the Buck converter further comprises a comparator configured to compare the feedback voltage with the reference voltage, wherein an output terminal of the comparator is coupled to a second input terminal of the compensation control circuit.

8. The SMPS of claim 1, wherein a second input terminal of the compensation control circuit is coupled to the output terminal of the transconductance amplifier.

9. The SMPS of claim 1, wherein the switching unit comprises:

another comparator configured to compare the compensation ramp voltage applied at a first input terminal of the another comparator with the feedback voltage of the Buck converter applied at a second input terminal of the another comparator;

a pulse generator coupled to an output terminal of the another comparator and configured to generate a pulse signal in response to rising edges in an output signal of the another comparator;

a logic circuit coupled to an output terminal of the pulse generator and configured to generate, based on the pulse signal, the switching control signal; and a first capacitor coupled between the first node and an electrical ground node.

10. The SMPS of claim 9, further comprising an edge detector coupled between the logic circuit and the ramp signal generator, wherein the edge detector is configured to generate a control signal for the ramp signal generator by detecting a rising edge in the switching control signal.

11. The SMPS of claim 1, wherein the Buck converter has a constant On-Time operation mode.

12. An integrated circuit (IC) device comprising:

a Buck converter; and a control circuit for the Buck converter, comprising:

a comparator configured to generate a comparator output signal by comparing a first voltage applied at a first input terminal of the comparator with a feedback voltage of the Buck converter applied at a second input terminal of the comparator;

a pulse generator configured to generate a pulse signal in response to rising edges in the comparator output signal, wherein the Buck converter is configured to be controlled by the pulse signal;

a transconductance amplifier configured to generate, at an output terminal of the transconductance amplifier, a current proportional to a difference between a reference voltage applied at a first input terminal of the transconductance amplifier and a second voltage applied at a second input terminal of the transconductance amplifier;

a first capacitor coupled between the output terminal of the transconductance amplifier and an electrical ground node;

a ramp circuit configured to generate, at an output terminal of the ramp circuit, a ramp voltage;

an adder circuit;

a first switch coupled between the output terminal of the ramp circuit and a first input terminal of the adder circuit, wherein a second input terminal of the adder circuit is coupled to the output terminal of the transconductance amplifier, and an output terminal of the adder circuit is coupled to the first input terminal of the comparator;

a second switch coupled between the output terminal of the transconductance amplifier and the second input terminal of the transconductance amplifier; and a third switch coupled between the second input terminal of the transconductance amplifier and the second input terminal of the comparator.

13. The IC device of claim 12, wherein during operation of the Buck converter, the first switch and the third switch are configured to be opened and the second switch is configured to be closed after no current flows through an inductor of the Buck converter for a pre-determined period of time.

14. The IC device of claim 13, wherein during operation of the Buck converter, the first switch and the third switch are configured to be closed and the second switch is configured to be opened when the feedback voltage of the Buck converter drops below the first voltage applied at the first input terminal of the comparator.

15. The IC device of claim 12, wherein the control circuit for the Buck converter further comprises a clamping circuit coupled to the output terminal of the transconductance amplifier, wherein the clamping circuit is configured to set a lower limit for a voltage at the output terminal of the transconductance amplifier.

16. A method of operating a Buck converter, the method comprising:

generating a feedback voltage based on an output voltage of the Buck converter;

sending the feedback voltage to a switching unit for the Buck converter;

sending the feedback voltage and a reference voltage to a first input terminal of a transconductance amplifier and a second input terminal of the transconductance amplifier, respectively, wherein a switch is coupled between an output terminal of the transconductance amplifier and a first node, wherein the switching unit is coupled between the first node and the Buck converter;

in response to detecting that no current has flowed through an inductor of the Buck converter for a pre-determined period of time, opening the switch;

generating a compensation ramp voltage using a ramp signal generator;

sending the compensation ramp voltage to the switching unit; and generating, using the switching unit, a switching control signal for the Buck converter based on the compensation ramp voltage and the feedback voltage of the Buck converter.

17. The method of claim 16, further comprising, after opening the switch:

comparing the feedback voltage with the reference voltage; and closing the switch in response to detecting that the feedback voltage drops below the reference voltage.

18. The method of claim 17, wherein generating the compensation ramp voltage comprises:

generating a second voltage using a ramp circuit of the ramp signal generator; and adding the second voltage to a first voltage at the first node, wherein the method further comprises limiting a minimum value of the first voltage to a pre-determined voltage value using a clamping circuit.

19. The method of claim 18, wherein when the switch is closed, the ramp circuit is configured to generate a ramp voltage as the second voltage, wherein when the switch is open, the ramp circuit is configured to hold the second voltage at a fixed value, wherein the fixed value is a value of the ramp voltage at the moment when the switch is opened.

20. The method of claim 19, wherein the ramp voltage is a non-linear voltage signal, wherein in a switching period of the Buck converter, a gradient of the non-linear voltage signal decreases continuously from a start of the switching period to an end of the switching period.

* * * * *